T. CARROLL.
CASH REGISTER.
APPLICATION FILED JULY 22, 1905.
1,149,342.
Patented Aug. 10, 1915.
11 SHEETS—SHEET 1.
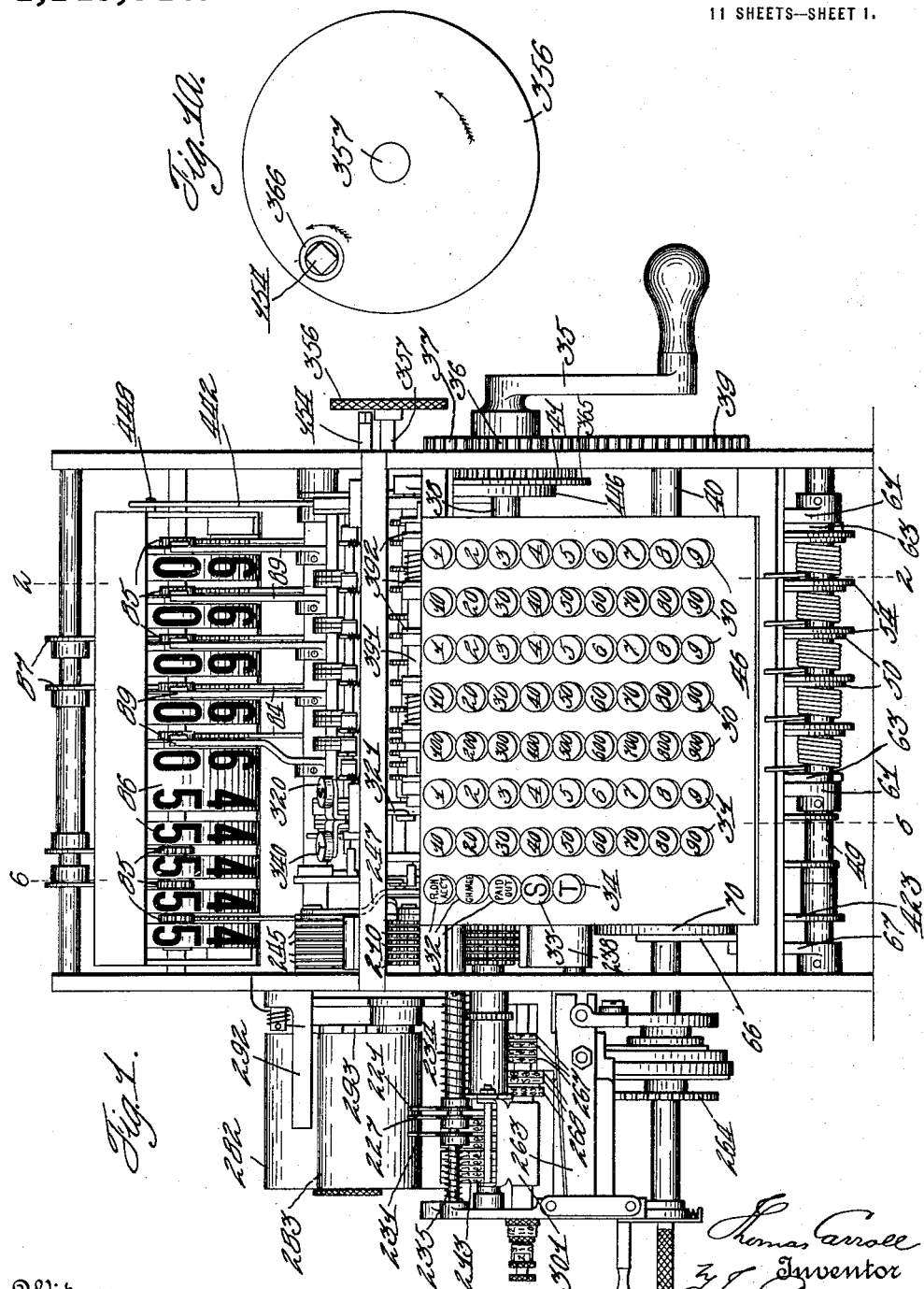
Witnesses
Thomas Carroll
Inventor
Attorneys

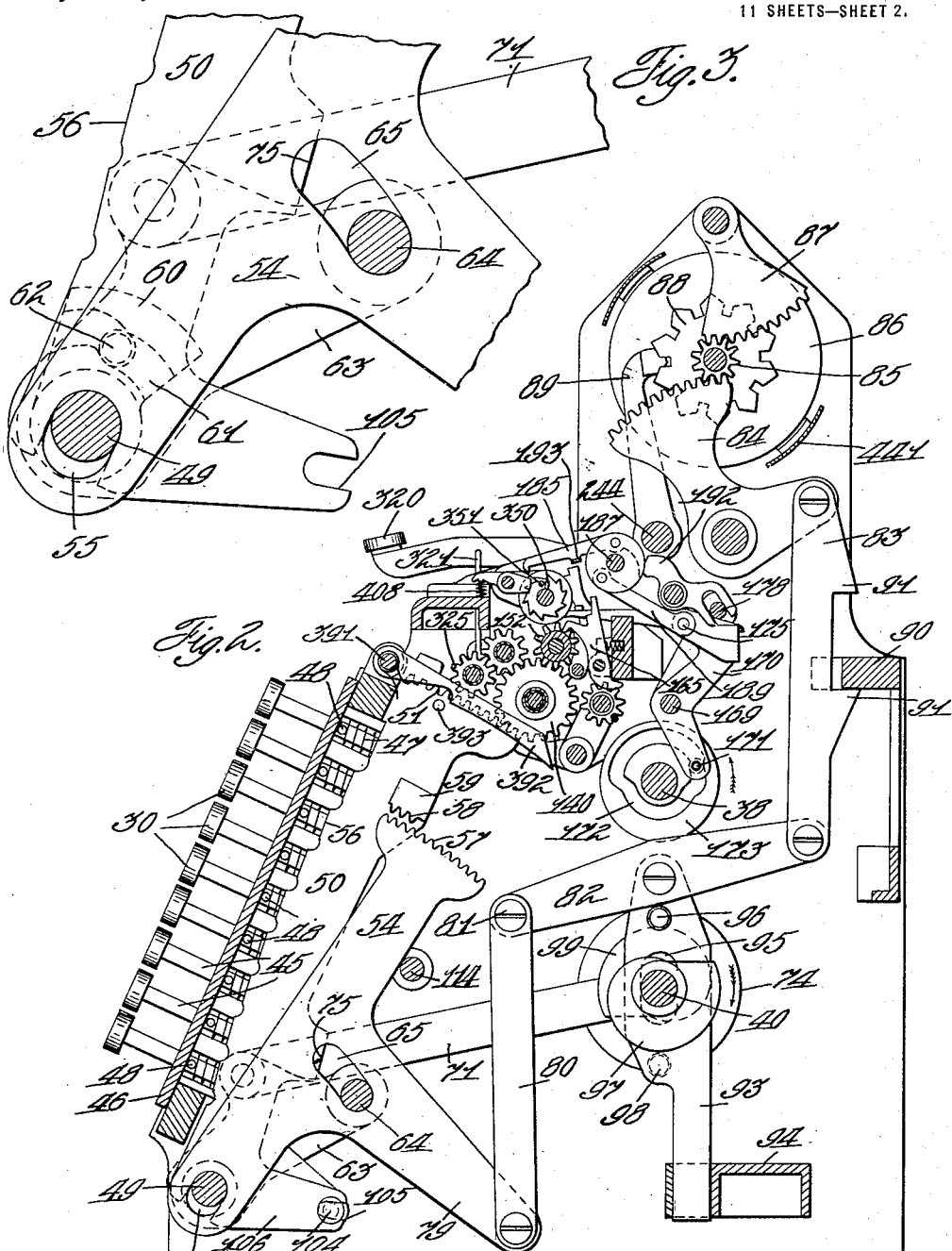

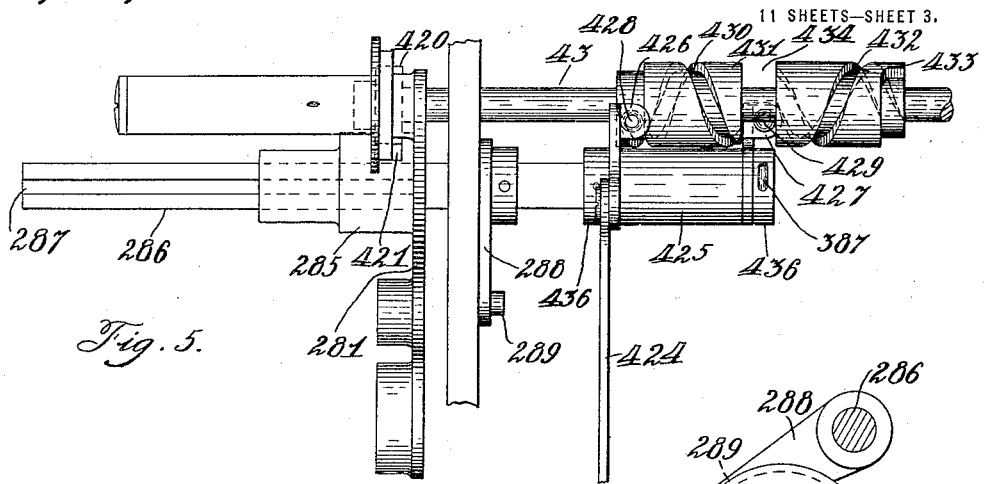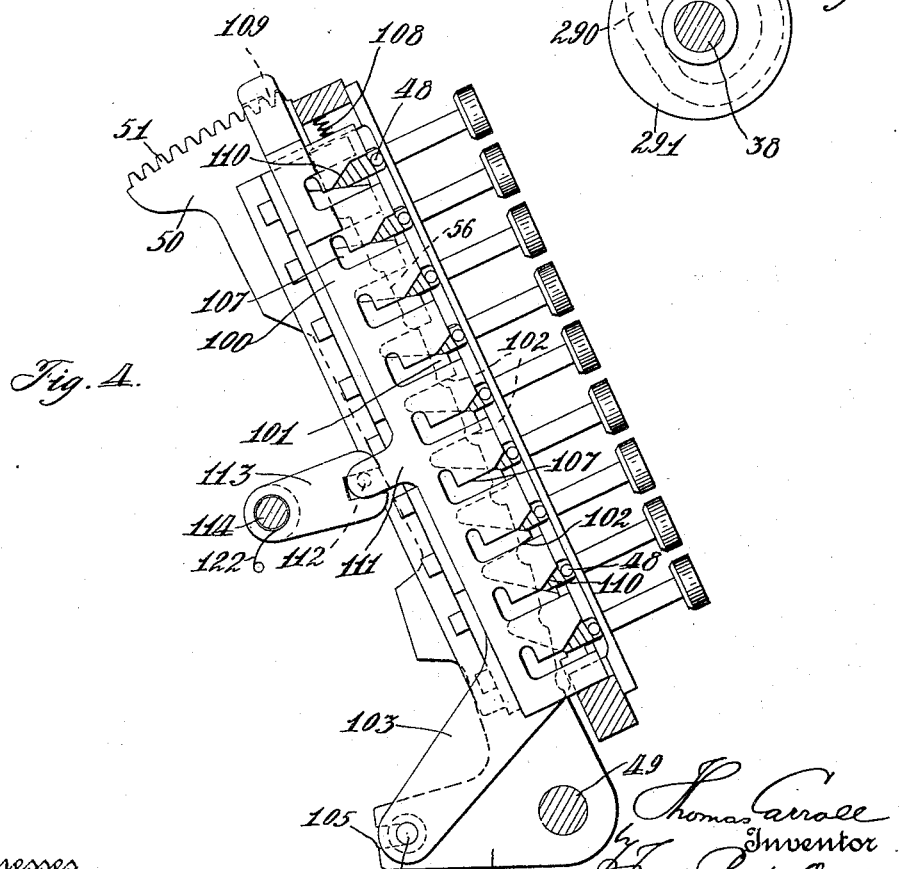

T. CARROLL.
CASH REGISTER.
APPLICATION FILED JULY 22, 1905.
1,149,342.
Patented Aug. 10, 1915.
11 SHEETS—SHEET 4.
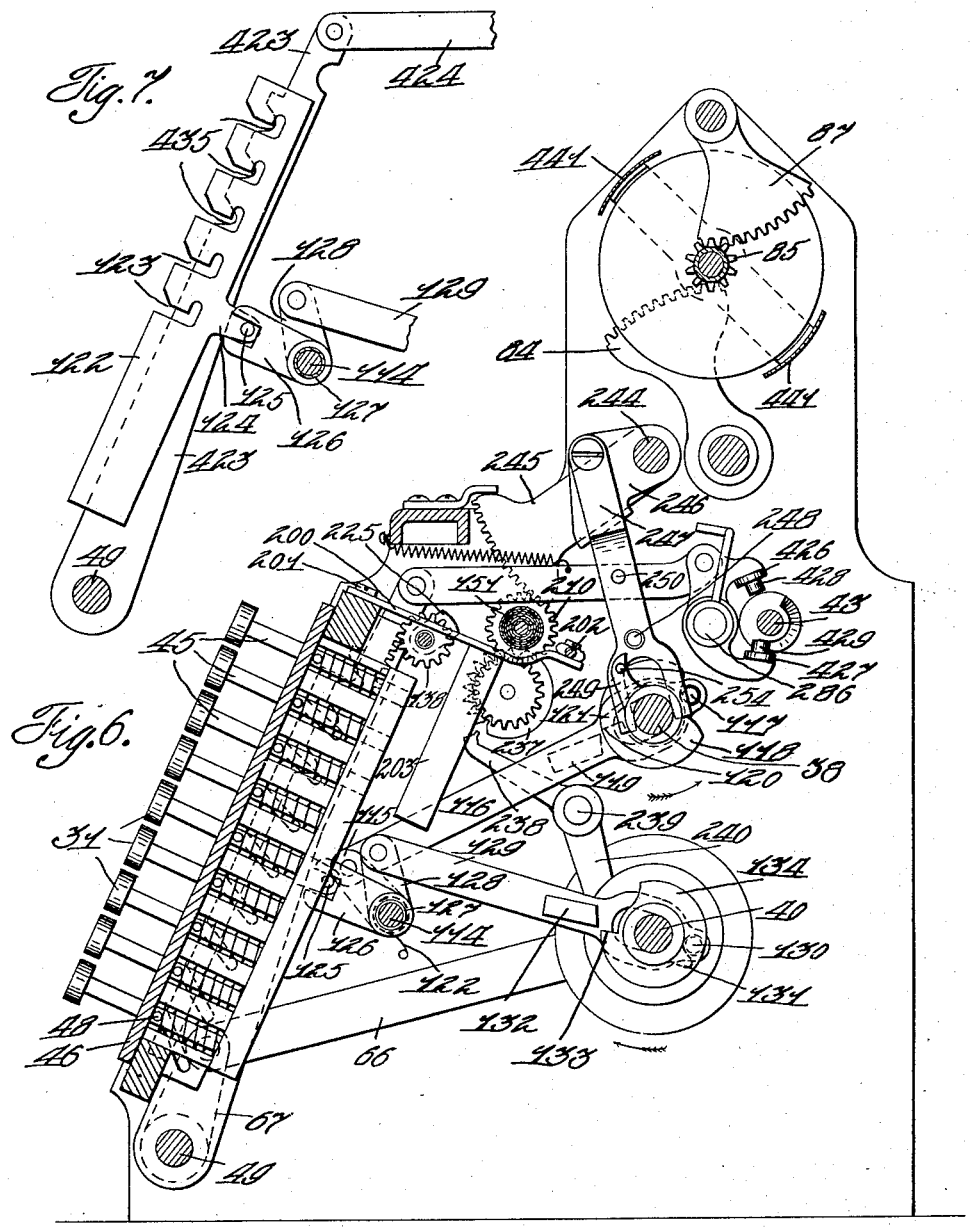
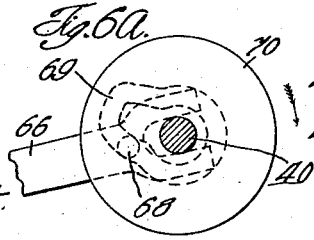
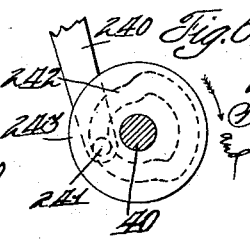

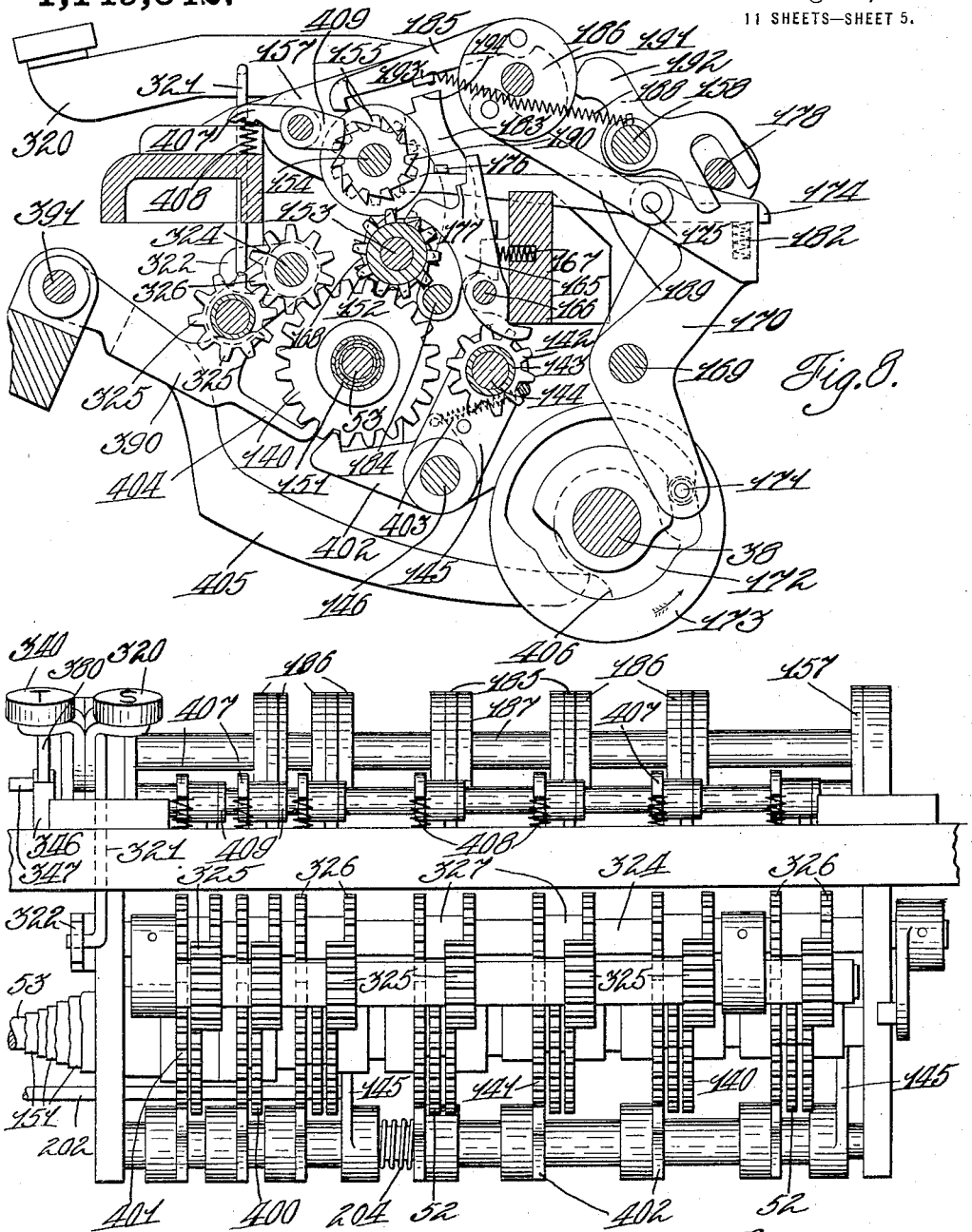

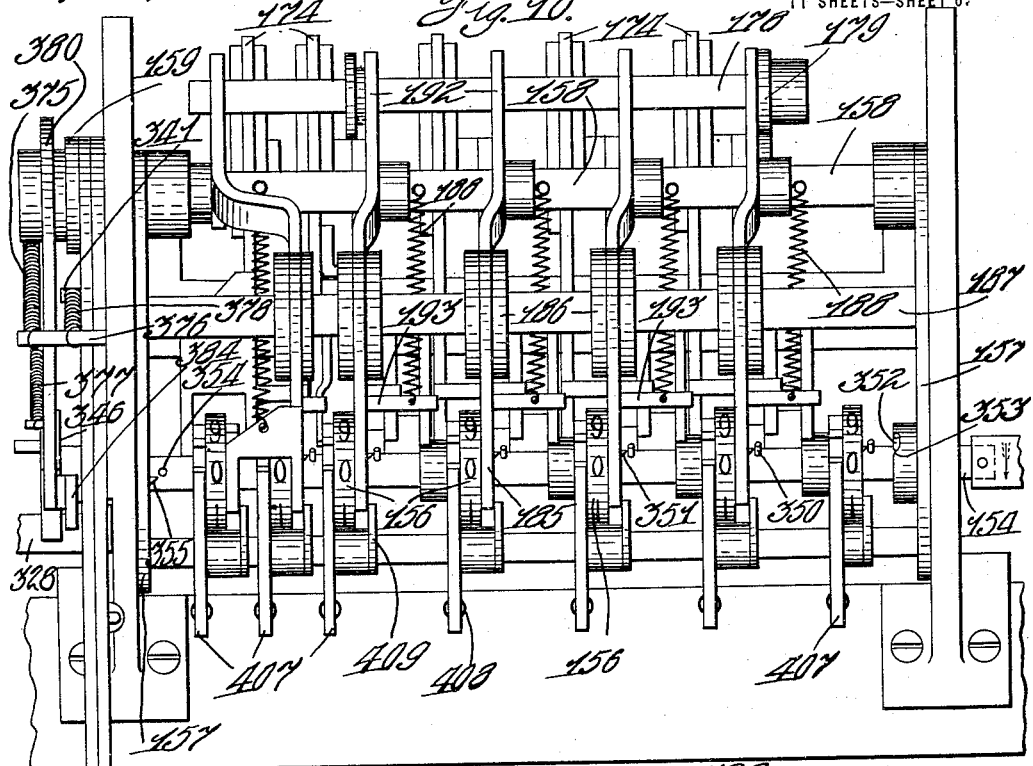
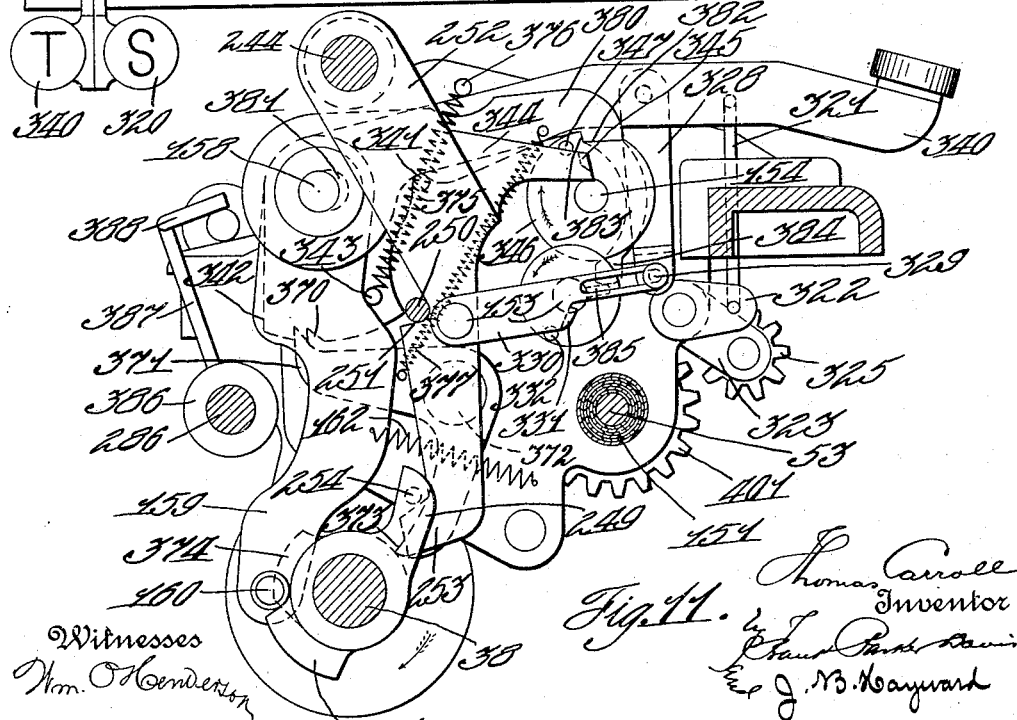

T. CARROLL.
CASH REGISTER.
APPLICATION FILED JULY 22, 1905.
1,149,342.
Patented Aug. 10, 1915.
11 SHEETS—SHEET 7.
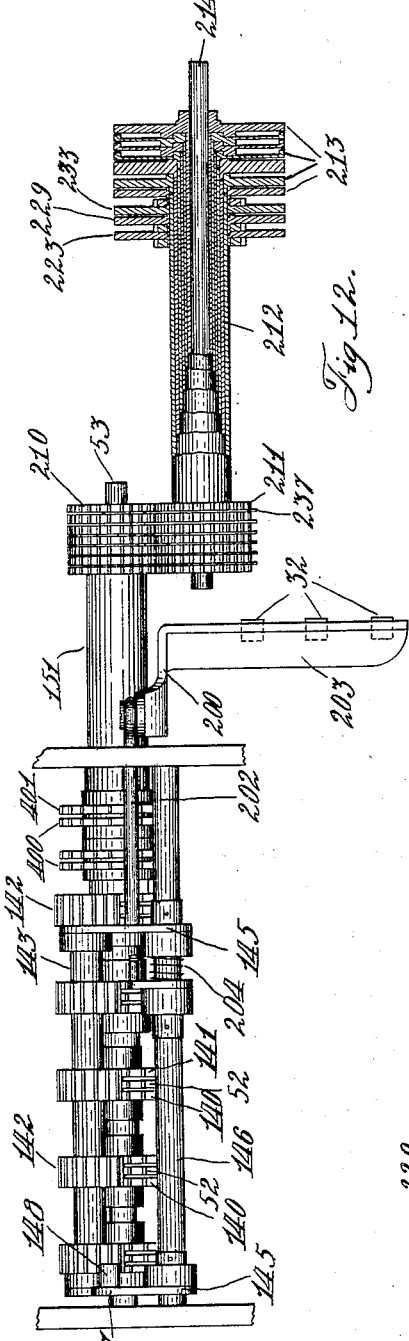
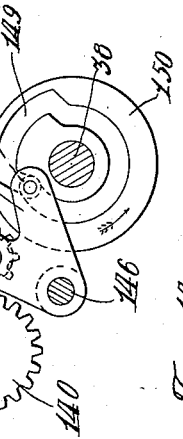
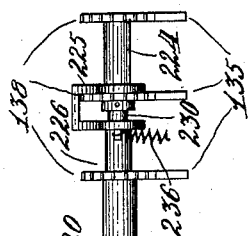
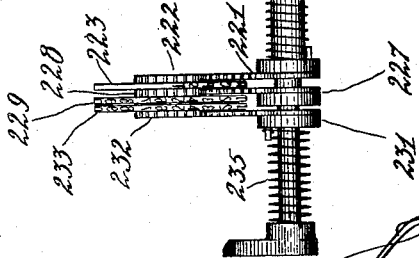

T. CARROLL.
CASH REGISTER.
APPLICATION FILED JULY 22, 1905.
1,149,342.
Patented Aug. 10, 1915.
11 SHEETS—SHEET 8.
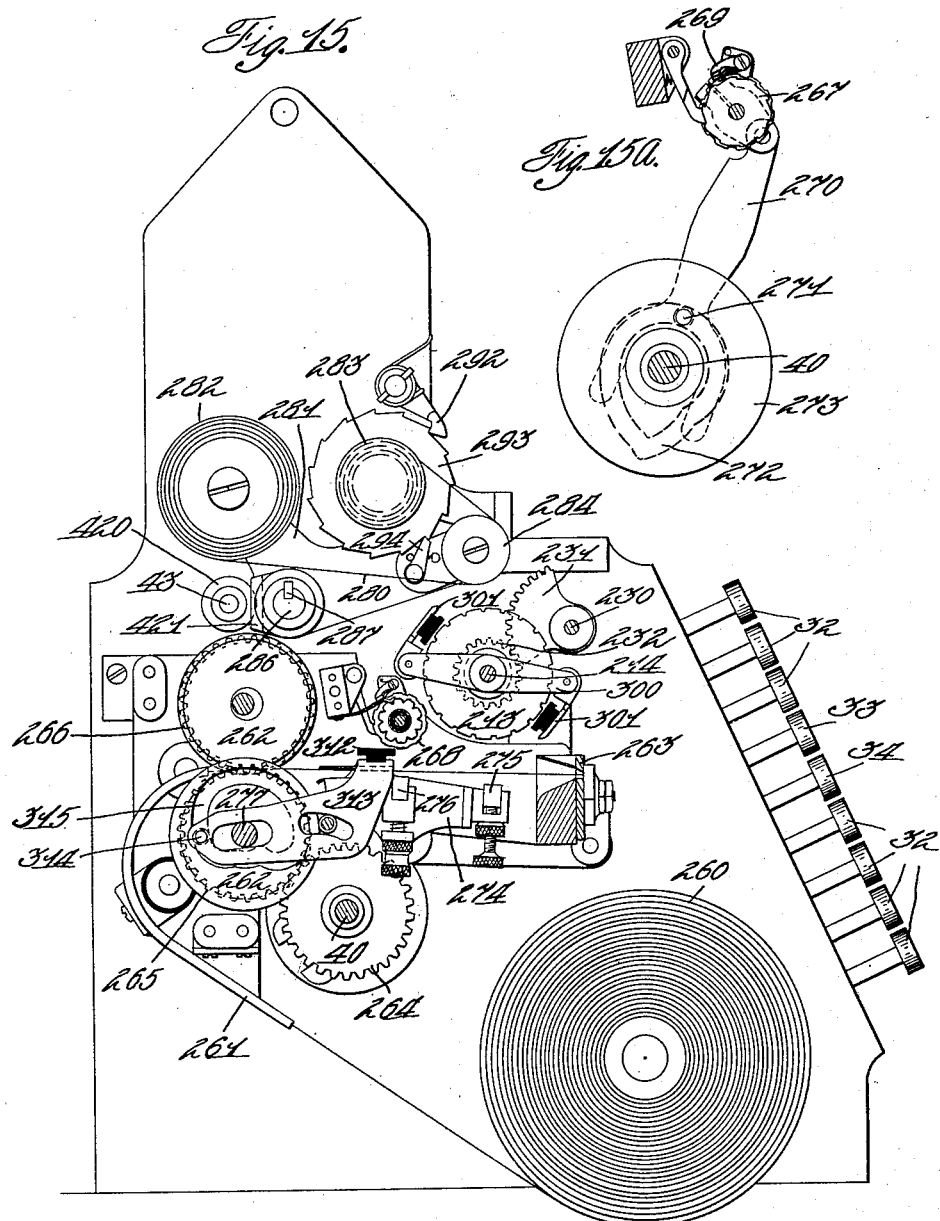
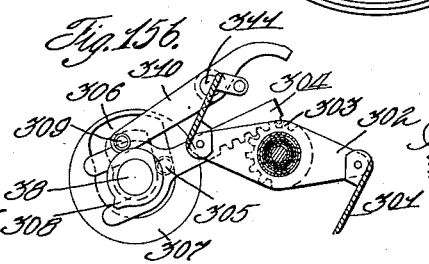

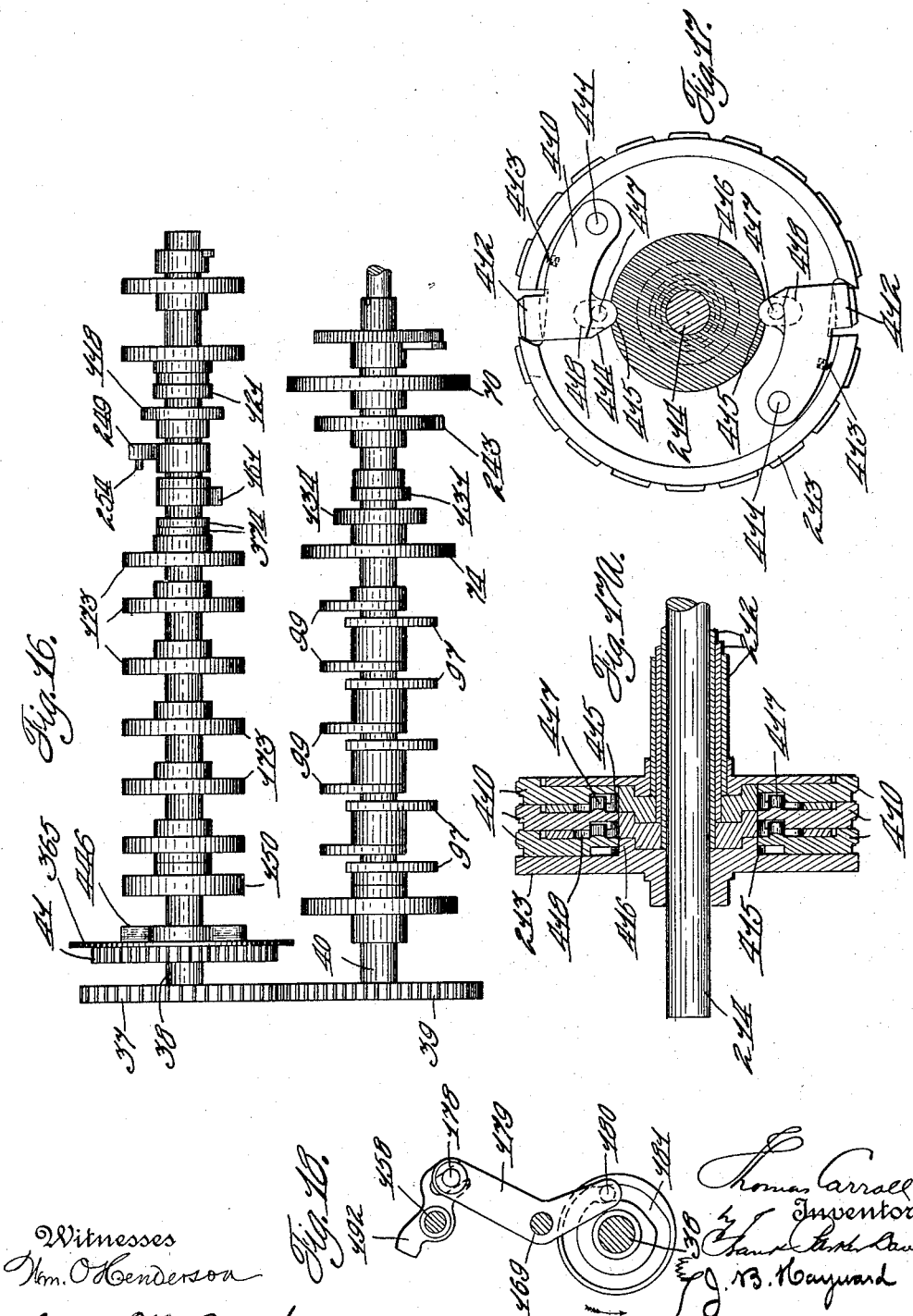

T. CARROLL.
CASH REGISTER.
APPLICATION FILED JULY 22, 1905.
1,149,342.
Patented Aug. 10, 1915.
11 SHEETS—SHEET 10.
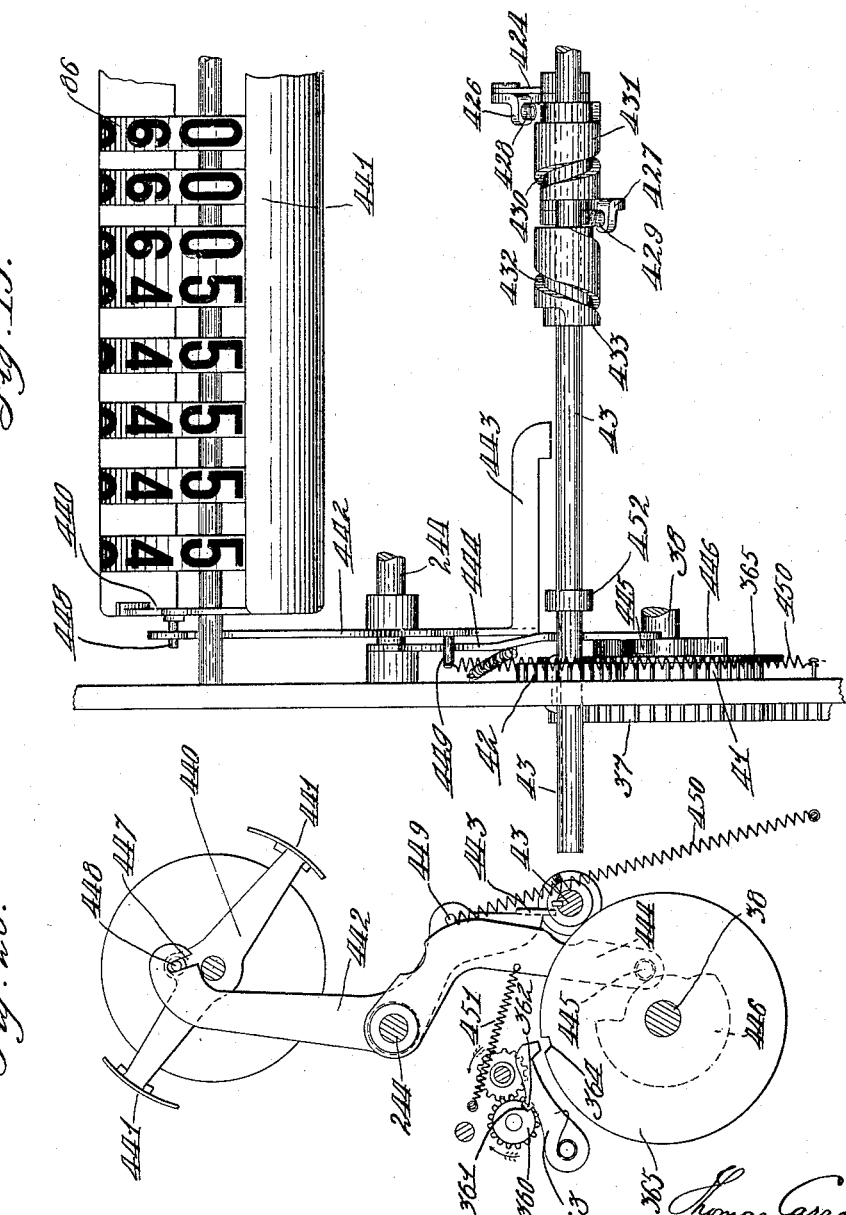

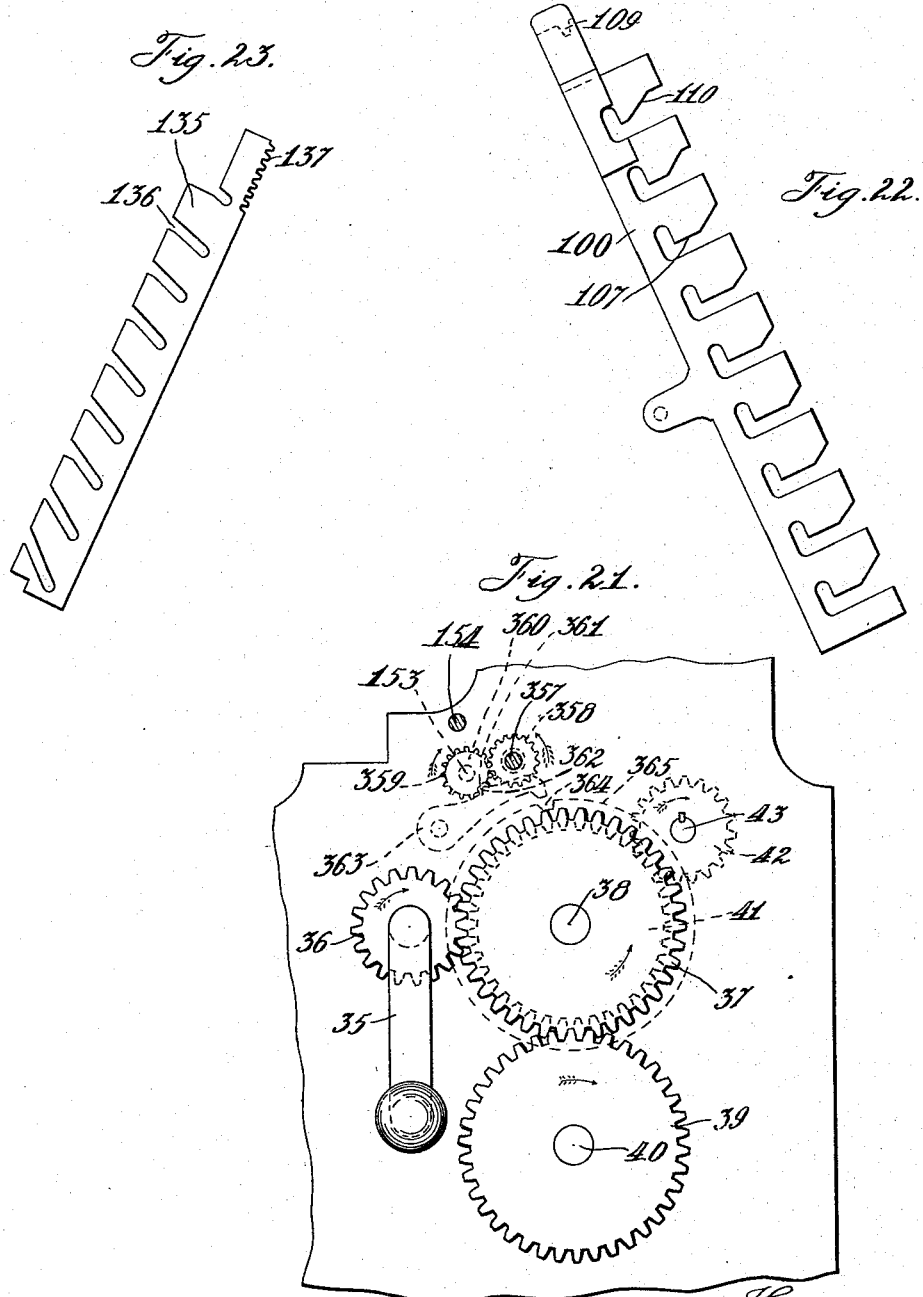

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,149,342. Specification of Letters Patent. Patented Aug. 10, 1915.

Application filed July 22, 1905. Serial No. 270,786.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has among its objects and purposes to provide improved devices whereby the operator may at any desired time secure a printed record of the so-called "summary totals" or the "grand total," the summary total being the total of the amounts registered between any two periods, and the grand total being the total of all the amounts registered from the time of the first transaction up to the time of the last one; and another object is to provide means for printing in separate columns the various items for the different sets of transactions; and accompanying these devices are certain locking features which form an advantageous accompaniment to the fulfilment of the above-mentioned objects.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings: Figure 1 represents a front elevation of the machine embodying these inventions, the outer cabinet of the same being removed. Fig. 1ª represents a detail view of the wheel for turning one of the sets of counters back to zero. Fig. 2 represents a vertical section of the machine on the line 2—2 of Fig. 1, certain of the parts however being omitted for the sake of clearness. Fig. 2ª represents a detail view of one of the operating cams. Fig. 3 represents a detail view of part of the mechanism connected with the restoring of the registering bars to normal position. Fig. 4 represents a detail side elevation of the key board showing the detent plates coöperating with the keys. Fig. 5 represents a detail view of the mechanism connected with the shifting of the printing carriage for printing in different columns. Fig. 5ª represents a detail view of a portion of the mechanism shown in Fig. 5, being the part which operates the platen carriage. Fig. 6 represents a vertical section of the machine taken on the line 6—6 of Fig. 1. Figs. 6ª and 6ᵇ represent detail views of certain of the operating box cams. Fig. 7 represents a detail view of the detent and operating bar connected with the special key bank. Fig. 8 represents a detail sectional view of the counter operating mechanism. Fig. 9 represents a front elevation of the parts shown in Fig. 8, certain of the devices however being omitted for the sake of clearness. Fig. 10 represents a top plan view of the parts shown in Fig. 8. Fig. 11 represents a side elevation of the parts shown in Fig. 8 but looking from the opposite direction. Fig. 12 represents a rear elevation partly sectionalized showing the connection between the setting elements and the type wheels. Fig. 13 represents a detail view showing the connection between the special setting elements and their type carriers. Fig. 14 represents a detail view of the device for causing the engagement of the idle pinions with the counter actuating gears. Fig. 15 represents an end elevation of the machine showing the printing mechanism. Fig 15ª represents a detail view of the device for operating the consecutive numbering wheels. Fig. 15ᵇ represents a detail view of the device for inking the type wheels. Fig. 16 represents a rear elevation of the operating shafts with the various operating cams carried thereon. Fig. 17 represents a detail view of one of the printing wheels of higher denomination showing the mechanism connected with the printing of zeros on these wheels. Fig. 17ª represents a sectionalized view of the wheels shown in Fig. 17. Fig. 18 represents a detail view of part of the devices connected with the operation of the transfer mechanism on the counters. Fig. 19 represents a rear elevation of the flash operating mechanism coöperating with the shaft which operates the laterally shifting printing carriage. Fig. 20 represents a detail view of the flash operating mechanism. Fig. 21 represents a detail view of a gearing connecting the operating handle with the main operating shaft. Figs. 22 and 23 represent detail views of two of the detent plates used in connection with the keys.

For the purpose of giving an outline of the general operation of the machine, it may be stated that there is a series of amount keys, a series of clerks' numerals keys and a series of special transaction keys, which when depressed set certain parts for the necessary operations of registering, recording and indicating, the completion of the operation of the machine being effected by the revolution of a crank handle or other suitable driving means.

The operation of the amount keys results in the setting of certain registering bars or segments to differential positions and upon the subsequent operation of the crank handle these registering segments are restored to normal position, and upon such restoration to normal position the counter is actuated and the printing wheels are set by means of certain idle pinions which form an intervening connection to transmit the differential movements of the registering segments to the counter and to the printing wheels. At the same time the indicators are set to positions corresponding to the values of the amount keys depressed, this setting of the indicators in each case being effected without the necessity of returning the indicators to normal zero position at the beginning of the operation of the machine prior to their renewed setting movement. Means are also provided by which when any one of the special transaction keys is depressed the counter is thrown out of operation.

The amount keys, the clerks' numerals keys and the special transaction keys are appropriately connected with type wheels and a printing mechanism is provided which prints both upon a detail strip and a check, these printing wheels being all returned to normal position at the end of each operation of the machine.

In order to secure the printing of the so-called "summary total" a special summary total key is provided; the machine is provided with both a summary total counter and also with a grand total counter, which latter is thrown into mesh with the summary total counter at each operation of the machine. Upon the pressing of a special summary total key the summary total counter is connected up to the amount printing wheels so that when the summary total counter is reset to zero, the printing wheels will be set to positions corresponding to the amounts shown by the summary total counter, and thereupon with the subsequent actuation of the operating handle the impression is taken of this amount thus set up upon the printing wheels. The summary total is thus therefore left in cleared condition, having been completely reset to zero and upon the registration of subsequent transactions the summary total counter will now give the total of the amounts registered from and after the previous resetting to zero.

In case it is desired to secure a record of the grand total of all transactions, a special grand total key is provided which when depressed throws the grand total counter into mesh with the summary total counter and also effects the depression of the summary total key whereupon the summary total counter is coupled to the printing wheels so that upon the turning to zero of the grand total counter the printing wheels are set to show the amount corresponding to that which was registered upon the grand total counter and upon the operation of the machine this grand total amount is printed. The summary total is in each case struck before the grand total is struck, and after the grand total is struck the summary total counter is reset to zero, since the resetting of the grand total counter to zero serves to register its amount upon the summary total counter.

In order to print the various items of the special transactions in a column separate from that of the cash transactions the detail strip is mounted upon a shifting printing carriage and the operation of any one of the special keys serves to set parts such that upon the subsequent operation of the handle the detail strip carriage will be shifted laterally so as to effect the printing of these items in a different column; and also upon the registering of such special transactions the flash which conceals the indicators is retained in concealing position and remains so until the next cash transaction.

With this general description of the operation of the machine, the specific parts thereof will now be described more in detail.

Referring to Fig. 1, it will be seen that there are five banks of amount keys 30, two banks of clerks' numerals keys 31 permitting the recording of clerks' numerals from 1–99, and a series of special transaction keys 32, a summary total printer setting key 33 and a grand total printer setting key 34, these latter two keys being merely for the purpose of setting the printing segments to indicate the printing of a summary total or a grand total, and being distinct from the summary total and grand total operating keys to be later described.

A crank handle 35 supplies the main actuating power of the machine and effects the rotation of the two main operating shafts by means of gearing best shown in Fig. 21. The handle itself is fast to a small gear wheel 36 which meshes with a larger gear wheel 37 mounted upon the outer end of the upper operating shaft 38, and the gear 37 in turn meshes with a companion gear wheel 39 fast upon the outer end of the lower operating shaft 40. These two shafts 38 and 40 are provided with the various operating cams for actuating the different parts of the machine as shown in Fig. 16.

Fast upon the shaft 38 and just inside the right hand frame of the machine is another gear wheel 41 (see Fig. 16) which meshes with a smaller gear wheel 42 (see Fig. 21) which is fast upon the right-hand end of an auxiliary operating shaft 43 which effects the shifting of the printing carriage in the manner to be described.

*Registering segments.*—The operation of the registering segment by the keys will now be described. The key shanks 45 (see Fig. 2) extend through suitable apertures in a plate 46 attached to the front of the machine and are normally spring-pressed outward by means of springs 47 and are limited in their outward movement by stop pins 48. Extending across the lower portion of the machine is a transverse shaft 49 upon which are pivoted the registering segments 50 which at their upper ends are formed with rack teeth 51 which mesh with pinions 52 mounted loosely upon a transverse shaft 53, these pinions serving to transmit the differential movements of the registering segments to the counter and printing wheels as later described. There is one of these registering segments for each bank of amount keys but there are none for the two banks of clerks' numerals keys or for the special transaction wheels, the printing wheels for these sets of keys being set in a manner different from the setting of the amount printing wheels. Coöperating with each of said registering segments 50 is an indicator setting segment 54 which is pivoted upon the transverse shaft 49 but at its pivotal point is formed with a slot 55 to permit the raising of these segments for the purpose to be presently described. The forward sides of the registering segments 50 are formed with steps 56 which are engaged by the pins 48 of the various keys so that upon the pressing inward of any key the segments 50 are rocked to a greater or less extent according to the key depressed, these differential movements being such as to effect the necessary graduations of registering movements from 1–9 corresponding with the values of the keys. The segments 50 are normally locked in forward position and are released by means of key detents and are also prevented from overthrow movement by key detents as will later be described. On the upper end of the indicator segments 54 are formed teeth 57 which are arranged to engage teeth 58 formed in a block 59 fast on the side of the registering segment 50. In order to raise the indicator segments 54 into engagement with these teeth 58 the following device is provided, as best shown in detail in Fig. 3. The transverse shaft 49 is a rock shaft, and it has fast upon it two upwardly extending arms 60 which are formed with cam grooves 61 into which projects an anti-friction roller 62 which projects from the side arm of a restoring frame 63, there being two of these side arms connected by a transverse restoring bar 64, which bar extends through slots 65 formed in the indicator segments 54 so that when the restoring frame is lifted vertically the restoring bar 64 will also lift the indicator segments 54 into engagement with the teeth 58 of the block 59 formed on the side of the registering segments 50. A rocking of the shaft 49 to effect this raising of the restoring frame 63 is effected by means of a link 66 (see Fig. 6) attached at the forward end to an arm 67 (see also Fig. 1) which is fast upon the rock shaft 49; the rearward end of the link 66 is bifurcated to straddle the lower operating shaft 40 and is formed with a pin 68 (see 69 formed in a disk 70 fast upon the operating shaft 40 so that when said shaft is rotated in the direction shown by the arrow in Fig. 6ª, the link 66 will be drawn slightly rearward and thereby will rock the shaft 49 and hence rock the arms 60 in such manner as to cause the walls of the cam grooves 61 to lift the rollers 62 and thereby raise the restoring frame 63 vertically the pivotal lower end of the restoring frame also being slotted on the shaft 49 to permit this vertical movement. As soon as the restoring bar has thus been raised vertically it is rocked forward by the following means: Pivoted to the forward upper portion of each side arm of the restoring frame is a link 71 (see Figs. 2, 2ª, and 3) which link at its rearward end is bifurcated to straddle the operating shaft 40 and is formed with a pin 72 projecting into the cam grooves 73 formed in a disk 74 fast to the operating shaft 40 so that upon the rotation of the operating shaft 40 in the direction shown by the arrow in Fig. 2ª, the link 71 is first drawn slightly rearward to permit the vertical raising of the restoring frame in the manner just described and then the remaining portion of the cam groove 74 is such that the link is forced forward thereby carrying the restoring frame 63 and the restoring bar 64 forward holding them in this position until almost the end of the operation of the machine, at which time the restoring frame is again dropped to lower position and the link 71 is retracted to normal position carrying the restoring bar 64 back to normal rearward position. This forward movement of the restoring bar 64 acts to restore the registering segments 50 to normal zero position by reason of the bar 64 striking the projections 75 formed on the lower rearward sides of the registering segments 50, and since the indicator segments have during this time been elevated into engagement with the blocks 59 formed on the sides of the registering segments 50, these segments 54 will thus be moved forward to an extent corresponding to the previous displacement of the registering segment 50 by the amount keys, and these indicator segments 54 will remain in this position until the restoring bar 64 returns to normal rearward position and thereby carries the indicator segments back with it to normal rearward position. The indicator segments 54 are arrested in their normal rearward position by means of a transverse shaft 114.

*Indicator setting mechanism.*—This forward setting movement of the indicator setting segments 54 is utilized to set the indicators in the following manner. The segments 54 are formed with rearwardly extending arms 79 (see Fig. 2) to which are pivoted links 80, to each of which links 80 is pivoted at 81 a power application bar 82, which at its rearward end is pivoted to another vertically extending link 83 attached to the rearward end of a bell crank formed indicator setting segment 84, which segment meshes with a pinion 85 fast on the side of the indicator 86. A second set of segments 87 serve to connect the duplicate indicators for indicating at the back of the machine as well as at the front of the machine in a well-known manner. To each indicator is made fast an alining wheel 88 which is engaged by an alining pawl 89 which is suitably operated from one of the main operating shafts of the machine to release the indicators while they are being set and to lock the same after they have been moved to proper position and retain them in such position until the next operation of the machine. The vertical links 83 extend through slots formed in transverse bars 90 of the main frame of the machine which slots serve to guide the links in their vertical movements and the links are provided with noses 91 engaging said bars, these noses serving to limit the vertical extent of movement of the links 83 between the "zero" and the "9" positions of the indicators. To the middle portion of each power application bar 82 is pivoted a downwardly extending bar 93 which extends into slots formed in the transverse guide bar 94 of the machine. These bars 93 are also formed with slots 95 at their middle portions to surround the lower main operating shaft 40. On one side of each bar 93 and above the slot 95 is an anti-friction roller 96 which is arranged to be engaged by a cam 97 fast upon the main operating shaft and adjacent to the bar 93; and upon the other side of each bar 93 is another anti-friction roller 98 situated below the slot 95 and arranged to be engaged by a cam 99 also fast to the shaft 40 and on the other side of the bar 93, the anti-friction roller 98 and cam 99 being shown in dotted lines in Fig. 2 and the roller 96 and cam 97 being shown in full lines in said figure. In the normal condition of the machine when the indicator stands at zero, the parts are in the position shown in Fig. 2; but when any indicator segment 54 is swung forward by the operation of the restoring bar 64 in the manner previously described, the link 80 is raised and since the indicator segment 54 is locked to the registering segment 50, and the latter has been returned to normal position, the pivotal pin 81 will therefore be held in a fixed position and becomes a fixed fulcrum point; but the raising of the pivotal point 81 has also raised the bar 82 and thereby raised the bar 93 and consequently also raising the roller 98, and thus upon the operation of the shaft 40 in the direction shown by the arrow, the cam 99 will act upon the roller 98 and draw the bar 93 downward thereby applying power to the bar 82 to rock the same about the fixed pivot 81 as a fulcrum and thus drawing downward the link 83 to set the indicator to an amount corresponding to the amount of movement of the indicator setting segment 54. As soon as the indicators have thus been set the alining pawls 89 are rocked inward to lock the same in set position, and at the final part of the operation of the machine the restoring bar 64 is returned to normal rearward position thereby carrying the indicator segments 54 back to normal rearward position and returning the pivotal point 81 to normal lower position; and if upon the next operation of the machine no key in this previously operated bank is now operated, the indicator segment 54 will not be moved forward at all but nevertheless will be moved slightly upward vertically to become locked to the block 59 and thus to the stationary registering segment 50 whereby the pivotal point 81 is now held positively in its lowermost position and becomes a new fulcrum point for the movement of the bar 82 so that the cam 97 now acts upon the anti-friction roller 96 to rock the bar 82 about this new fulcrum point and thereby restore the indicator to normal zero position. If however the indicator segment 54 is set twice in succession to the same point by means of the depression of the same key in any bank upon two successive operations of the machine, it will be apparent that the pivotal point 81 remains the same in each case and that the cams 97 and 99 will have no elevating or depressing effects upon their respective rollers and thus there will be no movement of the indicator but the same will remain in the position to which it was previously set upon the previous transaction; and similarly the extent of movement of the indicator from one amount to another is only enough to carry it from one such amount to the other without the necessity of first returning the indicator to zero position, this effect being produced by the shifting fulcrum point coöperating with the positioning of the point of application of the power to an unchanged location.

*Key detents.*—The detent plates coöperating with the amount keys will now be described, these plates differing somewhat from those coöperating with the clerks' numerals keys and the special transaction keys. As shown in Fig. 4 there are two detent plates situated below and coöperating with each bank of amount keys, one of these plates being the unlatching plate 100, shown in full lines in Fig. 4 and also shown detached in Fig. 22, and a stop plate 101 shown in dotted lines in said Fig. 4. These plates are suitably mounted in guide pieces supported by the main frame of the machine. The stop plate 101 is formed with V-shaped slots 102 of gradually increasing divergence from the "1" key to the "9" key, the upper wall of each slot however being straight with reference to the direction of the depression of the key, but the distance between the key pin 48 and this upper wall of each slot increases from the "1" key to the "9" key. This stop plate has a downwardly and rearwardly extending arm 103 on the end of which is a pin 104 projecting into a slot 105 formed in the rearward end of an arm 106 extending from the lower pivotal end of the registering segment 50. It will thus be seen that when the pin 48 of any key strikes its corresponding stepped portion 56 of the registering segment 50 and rocks the segment about its pivotal shaft 49, the rocking downward of the arm 106 will also pull downward upon the arm 103 and will therefore draw the stop plate 101 downward and will cause the upper wall of its corresponding V-shaped slot 102 to strike upon the depressed pin 48, and thereby the continued rearward movement of the segment 50 will thus be prevented because of the binding of the upper wall of the slot against the pin in this manner, and the construction is such that this contact of the wall against the pin takes place at the moment when the pin has just reached the extremity of the V-shaped slot, and thus any overthrow movement of the segment 50 is absolutely prevented. It will also be seen that if while any key is depressed it is attempted to depress any key of higher value, this would tend to pull the stop plate 101 still farther downward but the plate would be held effectually locked against movement by the fact that the pin of the key first depressed is held at the extremity of its slot 102, so that further extended movement of the plate 101 is effectually prevented; nor could a key of lower value be depressed simultaneously to its fullest extent because of the obvious fact that no two keys could simultaneously be so far depressed that their respective pins could at the same time occupy the extreme end of the V-shaped slot, since the stop plate 101 is moved to the different extents for each key depressed.

The latching plate 100 serves both to lock the keys in depressed position and also to unlock the registering segments 50 in the following manner: The plate is formed with slots 107 for each key pin 48, the shape of these slots being different for each key and being most clearly shown in Fig. 22. The lower end of the slot is formed with a right-angled portion for the purpose of permitting the nose formed thereby to latch over the key pin 48 and hold the key in depressed position. The plates are normally retained in downward position by means of springs 108. The upper end of the plate 100 has fast upon its side a single tooth 109 adapted to engage the teeth 51 of the registering segment 50 when the segment is in normal forward position whereby to hold the segment latched in such position. When any key is depressed its pin 48 strikes the beveled portion 110 of the upper wall of the slot 107 and forces the plate 100 upward and withdraws the tooth 109 from engagement with the teeth 51 thereby unlocking the registering segment to permit the same to move under the control of the key as heretofore explained, and it will be observed that the beveled portions 110 are differently situated with respect to the different key pins 48 so as to effect the unlocking of the segment 50 at different times according to the value of the key depressed. That is, the pin of the "1" or uppermost key gives the least extent of movement to the registering segment 50 and therefore strikes the same at almost the extremity of the downward movement of the key so that the beveled edge 110 of the slot opposite this key is at such distance from the key that the pin 48 will contact with it just before the pin contacts with the segment 50 and thus the segment will be unlocked just prior to its movement by the key; and the same holds true with reference to the other keys, *i. e.* the situation of the beveled portion 110 is such as to be struck by the key pin just prior to the time when the pin strikes the registering segment 50 so that the pin first unlocks the segment and then moves the same to the proper distance.

The keyboard is made of the so-called "flexible type" *i. e:* when one key has been depressed and is latched in depressed position it may be released by the depression of another key without the necessity of a separate release key, but in this particular construction no key can be releasable except by a key of higher value with the sole exception of the "9" key which is released by the "8" key.

When any key is depressed the stop plate 101 is moved downward so as to bring the upper wall of the slot 102 into contact with the pin of the key depressed and it will thus be seen that the corresponding upper walls of all the keys of lower value (i. e. higher up in the bank) are moved so far downward that the pins of these particular keys would when depressed meet with the solid portions of the stop plate 101 and hence be incapable of depression; but for the keys of higher denomination the stop plate 101 has not been moved far enough to block the key pins in this manner and therefore any key of higher denomination may be depressed, whereupon this pin strikes the beveled portion 110 of the latching plate 100 and of course releases the previously depressed key by the upward movement of the latching plate in a well known manner. In order to provide for the unlatching of the "9" key it will be observed in Fig. 4 that the upper wall of the V-shaped slot opposite the "8" key (i. e.: the next to the lowest) is not exactly straight but is cut away slightly at its forward end, so that when the "9" key is depressed and the stop plate 101 is moved to the extremity of its downward position, the upper wall of the V-shaped slot 102 opposite the pin 48 of the "8" key is not brought low enough to block the pin of this "8" key, but the cut-away portion permits the "8" key to be depressed, whereupon the pin strikes the corresponding beveled portion 110 of the latch plate 100 and hence releases the "9" key.

In order to provide for the unlatching of the keys by the operation of the machine, each latching plate 100 is provided with a rearwardly extending arm 111 formed with a pin 112 projecting into a slot formed in the forward side of an arm 113 fast to a rock shaft 114. Referring now to Fig. 6 it will be seen that this rock shaft 114 has fast upon it an arm 115 to which is pivoted a link 116 which at its rearward end straddles the upper operating shaft 38 and has formed upon it an anti-friction roller 117 arranged to be struck by a cam 118 fast to the operating shaft 38. The link 116 also has formed upon it a lug 119 arranged to coöperate with a locking shoulder 120 of a disk 121 fast to the operating shaft 38. A spring 122 surrounds the shaft 114 and acts upon the arm 115 to normally draw the link 116 forward and consequently through the arms 113 to assist in drawing the separate latching plate 100 downward. Upon the operation of any key the movement of the latching plate 100 in the manner just described rocks its arm 113 upwardly and thereby rocks the shaft 114 against its spring tension to carry the lug 119 into the path of the shoulder 120 and thus lock the operating shaft 38 from operation until the key is completely depressed at which time the locking plate 100 springs back to normal position and the lug 119 is withdrawn from locking position and the machine is free to be operated. Upon such operation of the machine and the consequent rotation of the shaft 38 in the direction shown by the arrow in Fig. 6, the disk 121 is withdrawn from the path of contact with the lug 119, and the cam 118 strikes the roller 117 and forces the link 116 backward thereby rocking upward all of the arms 113 moving all of the latching plates 100 upward to release the previously operated amount keys. It will be noticed that this releasing of the depressed keys takes place almost immediately after the operation of the machine has been begun, this being essential since at this time the registering segments 50 are being restored to normal position and the keys must be released prior to such restoration.

The two banks of clerks' numerals keys and the bank of special transaction keys are provided each with a latching detent plate 122 as shown in Fig. 7, each of these plates being formed with slots 123 having the usual right-angle portions for retaining the keys in depressed position by engagement with the operating pins 48, but in this case the beveled portions of the upper walls of the slots are uniformly constructed since there are no registering segments connected with these banks of keys and the plates 122 simply serve to latch the keys in depressed position and to permit the flexible release of the same. Each of the plates 122 has a downwardly extending arm 124 formed with a pin 125 projecting into a slot formed in an arm 126, and these arms 126 are fast to a collar 127 loosely mounted on the shaft 114, and to this collar is made fast an arm 128 to which is pivoted a link 129 which at its lower end straddles the lower operating shaft 40 (see Fig. 6) and is formed with an anti-friction roller 130 arranged to be engaged by a single tooth 131 formed upon a disk fast to the shaft 40; and the link 129 also has formed upon it a lug 132 arranged to engage a locking shoulder 133 formed upon a disk 134 fast to the operating shaft. Thus upon the operation of any clerks' numerals key or any special transaction key, the corresponding movement of the detent plate 122 serves to move the link 129 rearward by means of the afore described intervening connections, and thus carry the lug 132 into the path of the shoulder 133 to lock the machine from operation until a key has been completely depressed in which case the link 129 returns to normal forward position; and upon the subsequent operation of the machine the rotation of the shaft 40 causes the tooth 131 to strike the roller 130 near the end of the operation of the machine and retract the link 129 to release the previously operated clerks' numerals or special transaction keys. This release may take place at the end of the operation of the machine since there are no registering segments to be restored in the case of these particular keys as there is in the case of the amount keys.

Also coöperating with the two banks of clerks' numerals keys and the special transaction keys are other detent plates 135 shown in dotted lines in Fig. 6 and in detail in Fig. 23. It is the purpose of these plates to be given a differential movement by the keys and thereby set the printing wheels. Each plate 135 is formed with slots 136 arranged to be engaged by the pins 48 of the keys of these three banks referred to, and these slots 136 are differentially inclined as shown best in Fig. 23 so that the detent plate 135 will be given differential vertical movements corresponding to the key depressed; and each plate is formed at its upper and rearward extremity with rack teeth 137 which are arranged to engage with a pinion 138 (see Fig. 6). There is of course one of these pinions for each of the clerks' bank of numeral keys and the bank of special transaction keys and their differential movements are utilized to set the printing wheels for these banks in a manner to be later described. Of course the differential inclination of the slots 136 prevents the simultaneous depression of two keys in the same bank. The plates 135 are returned to normal position by the pressure of the key pins against the same when the keys are returning to normal outward position under their own spring tensions, and are assisted in this return to normal position by means of springs attached to the printing wheels for these banks as will be later described.

*Register operating mechanism.*—There are two separate counters or registering mechanisms in this machine, one of which will be designated the "summary total" counter and the other the "grand total" counter, the summary total counter giving the total of certain groups of transactions between certain periods as already explained and the grand total giving the total of all the transactions represented by the sum total of all the various summaries. As has already been stated the registering segments 50 mesh with operating gear wheels 52 mounted to revolve upon the transverse shaft 53 (see Figs. 2 and 9); but the gear wheel which is shown in Fig. 2 is not the gear wheel with which the registering segments 50 mesh but is a companion gear wheel of the same size mounted side by side with the operating gear wheel 52 as shown in Fig. 9. It will be seen by reference to this latter figure that for each of the five registering segments for the five banks of amount keys there is a series of three companion wheels mounted side by side on the shaft 53, the middle one of each of these series being as before mentioned, the gear wheel 52 which will be called the operating gear wheel, and the right-hand one (which is seen in Fig. 2) is the printer gear wheel 140 and the left-hand one is the counter gear wheel 141. Upon the forward movement of the registering segment 50 by the depression of any key, its corresponding operating gear 52 is rotated but this has no effect upon its companion counter and printer gears because the same are not at this time connected; but upon the return of the registering segment 50 to normal position in the manner described, the operating gear 52 is coupled up to both its companion gears 140 and 141 by means of an idle pinion 142 (see Figs. 8 and 12) which is mounted upon a collar 143 journaled upon the transverse shaft 144 which shaft is mounted between arms 145 which are pivoted upon a shaft 146. One of these arms has a rearwardly extending portion 147 (see Fig. 14) from which projects an anti-friction roller 148 which runs in a cam groove 149 formed in a disk 150 fast upon the upper operating shaft 38, the shape of the cam groove being such that upon the rotation of the shaft 38 the idle pinion is rocked forward into mesh with the gear wheels 140, 52 and 141, the width of the idle pinion being enough to span all three of these gear wheels, and of course there being a separate idle pinion for each of the five sets of triple gear wheels as shown in Fig. 12. By an arrangement which will be later described, the shaft carrying these idle pinions 142 is arranged to be laterally displaced by means of the operation of the special keys so that when they are rocked into mesh with the afore-described companion gear wheels they will couple up only the printer wheel to the operating gear wheel and will not couple up the counter gear to the operating gear and consequently the counter will be thrown out of operation.

To continue with the operation of the counter, it will be seen that the idle pinions 142 are thrown into mesh with the triple companion gears at the beginning of the operation of the machine and consequently as soon as the registering segments 50 are restored to normal position the revolution of the operating gear 52 will through the idle pinions 142 also cause the revolution of the printer gear 140 and the counter gear 141. The printer gears are by means of nested sleeves 151 (see Fig. 9) connected to appropriate printing wheels to be later described. Meshing with the counter gears 141 are the pinions 152 (see Fig. 8) of the summary total counter, these pinions being mounted upon a transverse shaft 153, and thus it will be seen that the successive operation of the counter gears 141 are transferred to the summary total counter pinions 152. These pinions do not have numerals upon their peripheries to enable the operator to tell at a glance how much the amount of registration has been but it is intended that this amount be determined by means of printing as will later be described.

Journaled upon a transverse shaft 154 extending above the summary total counter are the pinions 155 of the grand total counter, these pinions having fast to them disks 156 bearing numerals to designate the total amount of registration as shown in Fig. 10. This shaft 154 is carried between the side arms of a rock frame 157 which is mounted upon a rock shaft 158, this shaft being adapted to be rocked at each operation of the machine to rock the frame 157 downward and thereby carry the pinions 155 of the grand total counter into mesh with the pinions 152 of the summary total counter so that the movements of the summary total counter by the registering segments 50 will also be transferred to the grand total counter, and since the grand total counter is disconnected from the summary total counter by the return of the rock frame 157 at each operation of the machine, it will then be possible for the summary total counter to be reset to zero independently of the grand total counter. The means for rocking the shaft 158 to throw in the grand total counter as just explained comprises a downwardly extending arm 159 (see Fig. 11) which is fast to said rock shaft and at its lower end carries an anti-friction roller 160 which lies in the path of a cam 161 fast to the upper operating shaft 38, so that upon the operation of said shaft by the operation of the machine the arm 159 is carried rearward thereby rocking the frame 157 downward to carry the grand total counter into mesh with the summary total counter. The frame 157 is returned to normal position by means of a spring 162 attached to the arm 159.

*Transfer mechanism.*—Suitable transfer mechanism is provided for both the summary total and the grand total counters as follows, (see Fig. 8). The transfer tripping pawls 165 for the summary counter are pivoted upon a transverse shaft 166 and are spring pressed forward by means of springs 167 suitably seated in a stationary cross bar of the machine. Each summary counter wheel is provided with a transfer ratchet 168 and the forwardly extending nose of the tripping pawl 165 is arranged to be engaged by the ordinary transfer pin of the counter wheels, this pin not being shown herein but its construction and operation being easily understood as being part of the well known construction of transfer mechanism. Pivoted upon a transverse shaft 169 is a rock frame 170 carrying at its lower end an anti-friction roller 171 which projects into a cam groove 172 formed in a disk 173 fast to the upper operating shaft 38. The upper end of the frame 170 carries a series of summary counter transfer pawls 174 which are pivoted at 175 and extend forward over the summary total counter. The forward end of each of these transfer pawls carries a lug 176 which coöperates with a shoulder 177 formed upon the tripping pawl 165. Resting upon the rearward ends of the transfer pawls 175 is a transvere shaft 178 mounted in a rock frame 179 which, as shown in Fig. 18, is also pivoted upon the transverse shaft 169 and has a downwardly extending arm carrying a pin 180 which projects into a cam groove 181 formed in a disk fast to the operating shaft 38. Springs 182 seated below the rearward ends of the transfer pawls 174 normally force these pawls upward against the shaft 178.

The operation of these devices is as follows: Upon the operation of the shaft 38 the rock frame 170 is thus rocked rearward as will be seen from the shape of the cam groove 172 and thereby the transfer pawls 174 are rocked rearward and the lugs 176 formed on the forward ends thereof become seated on the shoulders 177 of the tripping pawls and now upon the operation of the counter wheels if any tripping pawl is tripped by its transfer pin, the shoulder 177 will be withdrawn from the lug 176 and the transfer pawl will drop down to engage the transfer pinion 168, but of course in the meantime to permit this dropping down of the transfer pawl 174, the shaft 178 has to be rocked forward, this being accomplished by the shape of the cam groove 181 shown in Fig. 18; and upon the completion of the operation of the machine, the continued rotation of the shaft 38 carries the rock frame 170 again forward and thereby the transfer pawls which have been tripped will effect the necessary transfer.

The transfer mechanism for the grand total counter comprises tripping pawls 183 pivoted upon a transverse shaft 184, above which extend the transfer pawls 185 which are pivoted between disks 186 journaled upon a transverse shaft 187, these pawls being normally drawn downward by means of springs 188. A link 189 connects the disks 186 to the rock frame 170. The forward end of the transfer pawls have hooked noses arranged to engage the transfer pinions 190 fast to the grand total counter wheels, and the rearward ends of the transfer pawls are formed with downwardly extending tails 191 which are engaged by a dog 192 mounted on the transfer shaft 158, the rearward divided legs of which dog straddle the aforesaid shaft 178 carried by the rock frame 179. The middle portion of each transfer pawl carries a lug 193 arranged to normally rest upon the shoulder 194 of the tripping pawl 183.

The operation of these parts is as follows: When the rock frame 170 is rocked rearward in the manner above described, the rearward movement of the link 189 rotates the disk 186 to carry the transfer pawls 185 forward, and the simultaneous forward movement of the transverse shaft 178 acts upon the legs of the dog 192 to withdraw the nose of the dog from the tails 186 and thereby permit the transfer pawls 185 to drop until the lugs 193 rest upon the shoulders 194 of the tripping pawls 183; and then upon the operation of the grand total counter the ordinary single transfer pins which are not shown herein but which are similar to those described for the summary counter and of course are well understood without further description, strike the tripping pawls and rock the same rearward sufficiently to withdraw the shoulders 194 from under the lugs 193 to permit the transfer pawls to drop still farther so that their noses engage the transfer pinions 190 and upon the final return movement of the rock frame 170 the link 189 is again carried forward to rotate the disks 186 and also draw rearward the transfer pawls 185 to effect the transfer for those wheels where the transfer has been set; and the return of the shaft 178 to normal position returns the dog 192 to normal position and hence returns the transfer pawls 185 to normal upper position.

*Throw-out for the counter.*—Upon the operation of any one of the three special transaction keys 32 for the transaction " Rec'd. on Acct.", " Chg.", and " Pd. Out " it is desirable to prevent the operation of the counter as is usual in machines of this class, and to effect this there is provided a lever 200 (see Fig. 6) pivoted to one of the main tie bars of the machine at 201, and this lever extends rearwardly and at its rearward end has pivoted to it a horizontal extending rod 202 (see Fig. 12) which rod is at its other end attached to one of the arms 145 of the frame which rocks inward the idle pinions 142, as has already been described with reference to the setting of the counter wheels and printer wheels by the registering segments (see Figs. 8 and 14). Referring again to Fig. 12 it will be seen that the lever 200 has a downwardly extending projection 203 which is arranged to be engaged by the beveled ends of the special keys 32 to be rocked about its pivot in such manner as to force the rod 202 to the left in Fig. 12, and thereby the arm 145 is forced to the left against the tension of the spring 204 and since this arm 145 is fast to the shaft 144 (see also Fig. 8) upon which are mounted the collars 143 and the idle pinions 142 it will be seen that the entire shaft 144 is shifted laterally to the left thereby also carrying to the left the other arm 145 which has the rearwardly extending arm 147 which carries the roller 148 for rocking the idle pinions 142 into mesh with their gear wheels as already described with reference to Fig. 14. The right hand end of the shaft 144 (looking in the direction of Fig. 12) is suitably counter-bolted so that the right hand pinion may turn freely upon said shaft, but with the shifting of the shaft to the left the pinion will be carried bodily with the shaft, this counter-bolting being a well known construction and not described further. Thus it will be seen that when any one of the special transaction keys is depressed the entire shaft 144 carrying the idle pinions 142 is shifted laterally to such an extent that the pinions 142 when rocked forward simply couple up the operating gear 52 to the printer gears 140 and do not couple the gears 52 to the counter gears 141, and thus upon the operation of any one of the special keys it will be seen that the summary total counter will not be operated and of course neither will the grand total counter be operated.

The length of the pin 148 which projects into the cam groove 149 for the purpose of rocking the idle pinions 142 forward, is such that upon the shifting of the shaft 144 in the manner just described, the pin 148 will not be withdrawn from the cam groove but will still remain in engagement with the same.

*Printing wheels.*—The printing wheels controlled by the amount keys are set by means of nested sleeves 151 (see Fig. 9) already described as being connected with the printer gear wheels 140, these nested sleeves 151 being connected with intermediate gear wheels 210 (see Fig. 12) which in turn mesh with gear wheels 211 which are attached at the ends of nested sleeves 212 which carry the amount printing wheels 213 mounted upon the shaft 214. There are also amount printing wheels for printing the amounts of higher capacity than the ordinary registering amounts as will be later explained, these high capacity wheels being necessary for the sake of printing the amounts registered upon the grand total counter.

The devices for setting the printer wheels for the clerk's numerals keys 31 and the bank of special keys 32, 33 and 34 is shown in detail in Fig. 13. As already explained, the differentially operated detent plates 135 (see Fig. 23) which coöperate with these three banks of keys have formed upon their upper ends the aforesaid teeth 137 which mesh with the pinions 138. The two pinions 138 shown at the right in Fig. 13 are for the two clerk's numerals banks and the pinion 138 shown at the left is for the bank of special keys, and the latter pinion is connected by a sleeve 220 to an operating segment 221 which meshes with a pinion 222 fast upon the side of the special printing wheel 223. The right hand pinion 138 is connected by a sleeve 224 to a yoke 225 which in turn is connected to a sleeve 226 which runs through to the middle operating segment 227 which meshes with a pinion 228 fast upon one of the printer wheels 229 for the clerk's numerals; and the middle pinion 138 is fast to the shaft 230 and is connected to the left hand operating segment 231 which meshes with a pinion 232 fast upon the left hand clerk's numerals printing wheel 233, the position of the segment 231 and the end clerk's numeral printing wheel 233, being shown in Fig. 15. This sleeve and the yoke connection as just described is adopted for the purpose of shifting the relative positions of these printing wheels so that they will print in proper order upon the paper. These three printer wheels 223, 229 and 233 are mounted upon the outside one of the nested sleeves 212 as shown in Fig. 12 so as to print side by side with the amount wheels, the relative positions of these wheels also being shown in Fig. 1.

The type wheel 223 is spring drawn to its normal position by means of a spring 234 (see Fig. 13) fast at one end to the main frame of the machine and at the other end fast to the segment 221; a similar spring 235 returns the clerk's type wheel 233 to normal position and a spring 236 attached to the yoke 225 returns the middle clerk's numeral wheel 229 to normal zero position, these springs also assisting in the return of the aforesaid differential detent plates 135 to normal lower position.

For the purpose of alining the amount type wheels after they are set to proper position, the gear wheels 211 (see Fig. 12) have fast upon their sides disks 237 which as shown in Fig. 6 are formed with alining teeth engaged by a series of alining pawls 238 attached to a frame mounted upon a shaft 239, from which frame extends downward an arm 240 which as shown in Fig. 6ᵇ carries at its lower end a pin 241 which plays in a groove 242 formed in a disk 243 fast upon the lower operating shaft 40 so that at the proper time in the operation of the machine after the type wheels have been set, the arm 240 is rocked forward and the alining pawls 238 are carried into engagement with the disks 237 to aline the amount type wheels in their set positions. There are no corresponding alining devices for the special printing wheel and the clerk's numeral wheels.

As has already been explained the special type wheel and the clerk's numeral type wheels are set by the depression of their respective keys, and the amount wheels are set by the return of the registering segments 50 to normal position upon the beginning of the operation of the machine. The special type wheel and the clerk's numeral type wheels are returned to normal position by the springs already described in connection with Fig. 13 as soon as these particular keys are released by the operation of their detents near the end of the operation of the machine as has already been explained. The return of the amount printing wheels however to normal position is effected by different means shown in Fig. 6. Pivoted upon a transverse shaft 244 in the upper part of the machine are a series of restoring segments 245, the teeth of which mesh with the gears 210 already described in connection with Fig. 12 as attached to the printer gears 140 and also through the gears 211 attached to the various amount printing wheels 213. Extending below all of the segments 245 is a yoke frame 246 also pivoted upon the shaft 244. This frame 246 is lifted to restore the segments 245 to normal upper position by means of a link 247 which extends downward and straddles the upper operating shaft 38 and is formed at its lower end with an anti-friction roller 248 arranged to be engaged by an operating cam 249 fast upon the rotation shaft 38. The link 247 is normally held in upward position by reason of a pin 250 projecting from its middle portion which pin is engaged by the shoulder 251 (see Fig. 11) of an arm 252 loosely mounted on the shaft 244, which arm 252 has at its lower end a rearwardly projecting foot 253 which projects into the path of a pin 254 formed upon the side of the cam 249, so that upon the rotation of the shaft 248 in the direction of the arrow shown in Fig. 11 the pin 254 will strike the foot 253 of the arm 252 and withdraw the shoulder 251 from engagement with the pin 250 and thereby will allow the link 247 and yoke frame 246 to drop and thereby permit the restoring segments 245 to be moved downward when the printing wheels are set in the manner hitherto explained: but upon the completion of the operation of the machine the cam 249 strikes the roller 248 and forces the link 247 upward and thereby restores all of the segments 245 and all of the amount type wheels to normal zero position and the arm 252 by gravity again swings rearward to cause its shoulder 251 to engage the pin 250 and thus retain the segments 245 in normal upper position. This arm 252 is also released by other means as will be later explained for the purpose of permitting the setting of the type wheels upon the printing of the summary and the grand totals.

*Check and detail strip printing mechanism.*—The mechanism for printing upon a check and also upon a detail strip is shown in Fig. 15. The check paper is wound upon a storage roll 260 and is fed through a chute 261 and thence between the feed rollers 262 beneath the row of type wheels 180 mounted upon the shaft 214 and between the knife blades 263. The impression rollers 262 receive their movement from the lower operating shaft 40 by means of gears 264, 265 and 266, these impression rollers being used to feed the check strip and to print upon the back of the check in the ordinary manner if desired. Situated adjacent to the aforesaid amount type wheels and special type wheels but laterally displaced from the same as shown in Fig. 1, are consecutive numbering wheels 267, side by side with which are dating wheels 268. These consecutive numbering wheels are operated by means of the ordinary fingers 269 customarily adopted for this purpose as shown in Fig. 15ª, these pawls being carried upon a frame actuated by a link 270 carrying a pin 271 projecting into a cam groove 272 formed in a disk 273 fast upon the lower operating shaft 40 so that the consecutive numbering type wheels will be actuated once at each operation of the machine. A check platen arm 274 has two platen surfaces 275 and 276 for printing both from the ordinary type wheels and the consecutive number and dating wheels, and this platen arm 274 is operated in the usual manner by means of a box cam actuated from the shaft 277 upon which the lower impression roller 262 is mounted, this method of actuating the check platen being already known in the art and needing no further description. A more detailed description of the general mode of operation of these various parts of the check printer will be found in the patent issued in the name of Thomas Carroll in the United States No. 751,611 dated Feb. 9, 1904. The knife 263 is also operated by means not shown but connected with one of the main operating shafts to actuate the knife at the proper time to serve the check strip.

The detail strip 280 is mounted upon a carriage 281 which is arranged to slide laterally for the purpose hereinafter to be explained. The strip is fed from a storage roller 282 and is wound upon a winding roller 283, being led over an impression roller 284 pivoted at the forward end of the frame 281. The frame 281 has formed upon its outer side as shown in Fig. 5, a collar 285, and by means of this collar the frame 281 is splined to a shaft—286, the splined groove 287 being shown in Figs. 5 and 15, the purpose of the spline being to permit the lateral shifting of the frame 281 carrying the detail strip and also to permit the rocking of the frame by the rocking of the shaft 286. This rocking of the shaft 286 is produced by means of an arm 288 fast upon said shaft and carrying an anti-friction roller 289 which projects into a cam groove 290 formed in a disk 291 fast to the upper operating shaft 38. Situated in the rear of the rock shaft 286 is the laterally shifting shaft 43 previously described which shaft is so connected with the detail strip frame 281 as to shift the detail strip to print the special transactions in a separate column as will later be described. Upon the rocking of the shaft 286 in the manner just explained, the forward end of the frame 281 is rocked downward to bring the impression roller 284 against the amount and special type wheels (see Fig. 15), and during such downward movement the paper is fed by means of a feed pawl 292 pivoted to the main frame of the machine and suitably spring pressed into engagement with a feed ratchet 293 fast upon the winding roller 283. 294 is a retaining pawl for this feed ratchet. The rocking downward of the detail strip frame in this manner is already old in the art as will be seen in the aforesaid patent the present improvements including the lateral shifting of this detail strip frame for the purpose of printing in different columns.

*Inking mechanism.*—For the purpose of inking the amount, special and clerk's numeral type wheels, there is pivoted upon the shaft 214 (see Fig. 15) a two-armed lever 300 which at its extremities carries ink pad holders 301. These ink pad holders 301 are likewise connected at the opposite sides of the type wheels by another two-armed lever 302 similar to the lever 300 (see Fig. 15ᵇ), and this lever 302 has formed upon it a collar 303 having formed in it teeth engaged by a rack bar 304 which at its rearward portion straddles the upper operating shaft 38 and carries an anti-friction roller 305 projecting into a cam groove 306 formed in a disk 307 fast on said shaft. Upon the operation of the machine the rack bar 304 is forced forward and the levers 300 and 302 are so rocked as to bring the ink pad rollers over the printing line of the type wheels whereupon a tooth 308 formed upon a disk also fast upon the shaft 38 strikes a roller 309 formed upon the rearward end of a lever 310 suitably pivoted to the main frame of the machine and forces the forward end of said lever 310 downward against the upper ink pad roller 301 to cause the inking of the upper line of type; and the lower ink pad when thus brought into position to ink the lower line of type is carried against the type wheels by the actuation of the check platen 274 in a well known manner these type wheels of course being formed with duplicate characters to print both from the upper side and the lower side simultaneously and thus print corresponding characters upon the detail strip and upon the check. Of course the ink pad holders 301 are withdrawn from normal position prior to the time of the actual printing.

The inking of the consecutive numbering and dating wheels is produced by means of an ink pad 312 (see Fig. 15) carried upon the end of an arm 313 which at its rearward portion is slotted to slide upon the shaft 277, and also at its rearward portion carries a pin 314 playing in the cam groove 315 formed in a disk which rotates with the gear wheel 265 so that upon the operation of the machine the arm 313 will be forced forward so as to brush over the consecutive numbering wheels 267 and the dating wheels 268, these wheels of course printing upon the check alone.

*Printing summary total.*—The mechanism for effecting a printing of the summary totals at any time is most clearly shown in Figs. 8, 9 and 11. It may be stated briefly that in order to effect this printing of the summary total it is necessary first to press a special operating key and then reset the summary total counter to zero and then operate the machine whereupon the summary total will be printed and the summary total counter will remain reset to zero. This special operating key 320 is marked with a designating character "S" as shown in Figs. 1 and 10, being as already previously explained different from the printer setting key 33 (see Fig. 1) which merely sets up a type wheel to show that the particular item printed is a summary total, it being intended that the key 33 also marked "S" shall be depressed to set the special type wheel to print "S" before the summary total operating key 320 is depressed. This summary total actuating key 320 has depending from it a link 321 which at its lower end is connected to an arm 322 fast to a yoke frame 323 pivoted upon a transverse shaft 324 and carrying at its lower end a series of idle pinions 325. Mounted loosely upon the shaft 324 are a series of pinions 326, and by reference to Fig. 9 it will be seen that these pinions 326 are arranged in pairs, one for each bank of amount keys or for each series of three gears 52, 140 and 141. These separate pairs are connected by intervening collars 327 and the right hand pinions of each pair (as seen in Fig. 9) are connected with their corresponding pinions 325, which pinions 325 are arranged opposite the printer actuating gears 140, while the left hand pinion 326 of the pair is constantly in mesh with the counter gear 141. The pinion 326 is so displaced to the right as not to be in mesh with the printer gear 140 and the idle pinion 325 is of suitable width to permit the coupling up of the pinion 326 to the printer gear 140. This coupling is effected by the depression of the summary total actuating key 320 which by depressing the link 321 rocks the yoke frame 323 downward and carries all of the idle pinions 325 into mesh with their corresponding printer actuating gears 140. The summary total counter is now reset to zero. The precise method of resetting the summary total counter to zero will be explained later it being the same as the method of turning the grand total counter to zero and comprising a turning of the wheels back to zero in a direction reversely to the direction of registration so that it results from this turning to zero that the same number of units by which any particular counter wheel has been turned will now measure the amount of rotation of this wheel back to zero, and since the counter gears 141 are during this time of course in mesh with the summary total counter, these counter gears 141 will be turned to a corresponding amount and thus through the pairs of pinions 326 and through the idle pinions 325 which are in mesh with the printer actuating gears 140, the amount printing wheels will likewise be set to show the amount exactly corresponding to that which was previously registered upon the summary total counter. This result having been accomplished the machine is now operated whereupon an impression is taken from the type wheels and the amount which has up to this point been added upon the summary total counter is now printed both upon the detail strip and the check, and the special printing key 33 having been depressed this amount is identified by the character "S" printed side by side with the amount.

As has already been stated with reference to the setting of the printing wheels these wheels are normally held locked in zero position by means of the arm 252 (see Fig. 11), the shoulder 251 of said arm engaging the pin 250 formed on the restoring link 247 (see Fig. 6). In order to produce this unlocking effect by the operation of the summary key 320 the key has extending downward from its middle portion an arm 328 which at its lower end carries a pin 329 which plays in the slotted end of an arm 330 pivoted to the middle portion of the locking arm 252, said slot permitting the free movement of the said arm 252 independently of the devices now to be described. When the summary total key 320 is depressed the arm 328 carries the arm 330 downward to bring an ear 331 formed on the side of the arm 330 into the path of the pin 332 fast upon a disk attached to the end of the shaft 153 upon which the summary counter pinions are mounted so that upon the rotation of said shaft 153 in the direction shown by the arrow in Fig. 11 to turn the counter wheels to zero position the pin 332 will strike the ear 331 and by drawing the arm 330 forward will thus withdraw the locking arm 252 from engagement with the pin 250 and thus permit the dropping of the yoke frame 246 (see Fig. 6) and the consequent dropping of the restoring segments 245 when the printing wheels are set by the operation of the turning to zero of the summary counter. The summary total key 320 is latched in depressed position by means to be later described and is unlatched and permitted to return to normal position upon the beginning of the operation of the machine whereby the idle pinions 325 are thrown out of mesh with the printer actuating gears 140 so that the restoring of the printer wheels to zero position by means of the yoke frame 246 (see Fig. 6) will not return the summary counter to show its previous amount of registration but will leave the same reset to zero.

Having once reset the summary total counter to zero and at the same time having printed the amount of such summary total, a new set of transactions is registered on the machine until such time as a second summary total is desired in which the same process is repeated and this is done as often as dsired, the summary total counter in each case being returned to zero. During all this time all of the amounts have regularly been added upon the grand total counter, the amount of registration on which may at any time be determined by viewing the numeral disks 156 (see Fig. 10) of the grand total counter. In order to secure a printed record of this grand total the following mechanism is provided.

*Grand total printing.*—There is a grand total actuating key 340, this key bearing the special designation "T" is shown in Figs. 1 and 10. As in the case of the summary total printing it is intended that the special printing key 34 shall be depressed when the total printing actuating key 340 is depressed so as to set up the special type wheels to print the character "T" in conjunction with the amount of the grand total so as to identify the same. Both the grand total key 340 and the summary total key 320 are pivoted about the previously described rock shaft 158 (see Fig. 11) which as previously explained is rocked to carry the grand total counter into mesh with the summary total counter. Projecting laterally from the summary total key near its pivotal point is a pin 341 (shown also in dotted lines in Fig. 10) which pin projects under the lower side of the grand total key 340, so that when the grand total key 340 is depressed it will act upon the pin 341 and likewise cause the depression of the summary total key 320, and thereby the idle pinions 325 will be carried into mesh with their respective printer gears 140 as hitherto explained so as to couple up the summary total counter to the printing wheels. The grand total key 340 is formed with a downwardly projecting arm 342 upon which is formed a pin 343 which engages the previously described downwardly extending arm 159 so that upon the operation of the grand total key the pin 343 will be carried rearward and will rock the arm 159 rearward and thereby rock the shaft 158 to throw the grand total counter into mesh with the summary total counter as already explained. The grand total counter is now turned to zero in the manner to be presently described and since this direction of the resetting to zero is such as to move the grand total counter wheels in a direction reversely to that of their ordinary registration each grand total pinion will be turned a number of units corresponding to the position to which it has been set by registration and consequently since the grand total counter is in mesh with the summary total counter this resetting of the grand total will act through the mediation of the summary total counter pinions to turn the amount printing wheels to position to show the exact amount which has been registered upon the grand total counter in precisely the same manner in which they are turned when the summary total counter is reset to zero. Then upon the operation of the machine this grand total amount is printed on the check and detail strip, being identified by the special character "T" as explained.

In order to produce the necessary unlocking of the type wheels by the movement of the aforesaid arm 252 said arm is formed with a forwardly projecting arm 344 which is formed with an ear 345 and projecting from a disk 346 fast to the shaft 154 upon which the grand total counter wheels are mounted is a pin 347; and when the grand total counter is rocked downward into mesh with the summary total counter the pin 347 is brought opposite the ear 345 so that upon the turning to zero of the grand total counter by turning the shaft 154 in the direction of the arrow shown in Fig. 11 the pin 347 strikes the ear 345 and thereby draws the arm 252 forward to release the locking shoulder 251 from the pin 250 and thus release the restoring yokes 245 and consequently the printer wheels in a manner previously described. For the purpose of turning the grand total counter to zero the shaft 154 has projecting from it pins 350 (see Figs. 2 and 10) which are arranged to engage projections 351 formed on the sides of the grand total counter wheels. A pin 352 also projecting from the shaft 154 normally stands in a cam recess 353 formed in a collar projecting from the main frame of the machine so that upon the rotation of the shaft 154 in the direction shown by the arrow in Fig. 10 the pressure of the pins 352 against the inclined wall of the recess 353 forces the shaft 154 laterally to the left and thereby carries all of the pins 350 into engagement with all of the projections 351 to restore the counter wheels to zero. With one complete rotation of the shaft a pin 354 formed on the left hand end of the shaft 154 strikes the stationary projection 355 and arrests the rotation of the shaft until the same is allowed to shift back to the right to normal position. This method of resetting counter wheels to zero is already well known in the art the peculiar feature of it being that by this means the counter wheels are turned backward to zero in a direction reversely to their direction of registration and consequently if any wheel has been moved only three units the pin 350 will engage its corresponding projection 351 on this particular wheel after the shaft has made seven-tenths of a revolution and thus the counter wheels will be turned reversely a distance of three units back to normal position this method being essential to transfer the amounts registered upon the counter wheels to the printer wheels and thereby have the printer wheels read exactly the same as the counter previously did before it was reset to zero. In order to rotate the shaft 154 said shaft is extended to the right through the side frame of the machine as shown in Fig. 1 and is formed on its outer end with a square portion to be engaged by any suitable key whereby to rotate the shaft to the necessary extent. The construction of the shaft and summary total counter for the purpose of turning this counter to zero is precisely the same as that just described for the grand total counter and for the purpose of turning this summary total counter shaft to zero there is provided at the right hand side of the machine a knurled disk 356 (see Figs. 1 and 1ᵃ) this disk being fast upon a shaft 357, which shaft has fast to it a pinion 358 (see Fig. 21) which meshes with a companion pinion 359 fast upon the right hand end of the summary counter shaft 153, so that upon the rotation of the knurled disk 356 by hand in the direction shown by the arrow in Fig. 1ᵃ the shaft 153 will be turned in the direction shown by the arrow in Fig. 21 which is the necessary direction for resetting the summary counter to zero.

For the purpose of locking the machine while the summary total counter is being reset to zero the aforesaid shaft 153 has fast to it and adjacent to the pinion 359 a disk 360 in which is formed a notch 361 into which projects a nose 362 formed on a pawl 363 which pawl is arranged to engage a notch 364 formed in a disk 365 fast to the upper operating shaft 38 so that when the summary total counter is being reset to zero the disk 359 will act upon the nose 362 and force the pawl 363 into engagement with the notch 364 and thereby lock the machine from operation, and likewise after the machine has been started in operation the periphery of the disk 365 will prevent the pawl from being forced downward and hence prevent the resetting of the summary total counter at this time.

By reference to Figs. 1 and 1ᵃ it will be seen that access to the shaft 154 for the purpose of resetting the grand total counter to zero may be had only through an aperture 366 formed in the disk 356 so that both counters cannot be simultaneously reset to zero but must be reset in turn.

For the purpose of holding the grand total counter key in depressed position, the previously described arm 342 (see Fig. 11) which extends downward from said key is formed with a notch 370 arranged to be engaged by a pawl 371 pivoted about a stub shaft 372 and having a downwardly extending arm 373 arranged to be engaged by a cam 374 fast upon the operating shaft 38. When the grand total key 340 is depressed the arm 342 is carried rearward and the pawl 371 engages the notch 370 and holds the key in depressed position until the cam 374 strikes the arm 373 and releases the pawl from engagement with the notch and thereupon the key is free to resume its normal position, which it does under the influence of a spring 375 which as shown also in Fig. 10 is attached at the upper end to a pin 376 projecting from the main frame of the machine and at its lower end is attached to the previously described pin 343 which actuates the counter engaging arm 159. The latching pawl 371 is normally drawn upward to engage its notch by means of a spring 377 which connects said pawl with another locking pawl to be presently described. Of course the return of the total key 340 to normal upper position is also assisted by the action of the spring 162 in drawing forward the arm 159 and thereby acting through the pin 343 to return the grand total key.

For latching the summary total key 320 in depressed position there is an arm similar to the arm 342 which performs this function for the grand total key and there is also a latching pawl similar to the pawl 371 with a corresponding releasing cam, these parts being situated side by side and for that reason not being visible in Fig. 11. A spring 378 (see Fig. 10) extends from the aforesaid pin 376 to the previously described pin 341 which projects laterally from the summary total key so as to assist in the return of the summary total key to normal upper position.

In the correct operation of the machine it is intended that the last summary total shall be printed before the grand total is printed and for this reason a lock is provided whereby it is impossible to reset the grand total counter to zero for the purpose of printing its amount until after the operation of turning to zero of the summary total counter. This device comprises a locking pawl 380 (see Fig. 11) pivoted upon the rock shaft 158 and having a slot 381 formed at this pivotal point to permit rearward movement of the pawl. The forward end of this pawl 380 is formed with a nose 382 which engages a rocking shoulder 383 of the aforesaid disk 346 which is fast on the end of the grand total counter shaft 154 so that normally the pawl 380 locks the disk 346 and thus locks the shaft 154 from being turned to reset the counter to zero. The forward end of the pawl 380 also has extending downward from it a curved arm 384, which at its lower end coöperates with a pin 385 projecting from the summary shaft 153 so that upon the rotation of said shaft in the process of turning the summary counter to zero the pin 385 will lift upon the arm 384 to disengage the pawl 380 from the disk 346, whereupon the spring 377 which connects this pawl 380 with the previously described latching pawl 371 acts to pull the pawl 380 rearwardly so that the nose 382 thereof rests upon the periphery of the disk 346 and the total counter shaft is then unlocked. Upon the operation of the machine it has been seen as described with reference to Fig. 5ª, that the shaft 286 is rocked and this shaft is shown in Fig. 11 as having formed upon it a collar 386 to which is attached an upwardly extending arm 387 from which projects forward a finger 388 which strikes the rearward end of the locking pawl 380 and forces the same forward into locking position again to engage the locking notch 383 of the disk 346, so that the grand total counter shaft is again locked from operation.

It will thus be apparent that when the summary total counter is thus turned to zero for the purpose of printing such summary total, the grand total counter is thus unlocked for turning to zero but upon the operation of the machine is immediately again locked, by reason of the finger 388 forcing the locking pawl 380 again forward in the manner just described so that this operation of the machine to print the summary total again locks the grand total counter from being turned to zero, so that it is essential again to rotate the summary total shaft 153 whereupon the pin 385 again acts to free the pin 380 from its locking disk and thereby permits the turning to zero of the grand total counter and after such turning to zero of the grand total counter the machine is operated and the grand total is printed in the manner explained, and upon such operation of the machine the finger 388 again forces the pawl 380 forward to lock the grand total counter from turning to zero. However since in the process of resetting the grand total counter to zero, this counter has necessarily been thrown into mesh with the summary total counter which has previously been reset to zero, it results that the complement of amount registered upon the grand total counter is thus transferred to the summary total counter so that completely to clear the machine and have both counters reset to zero it is now necessary again to turn the summary total counter shaft 153 so as to reset the summary total counter to zero, the machine of course not being operated in such case since the grand total has already been printed and by this means both counters are now reset to zero and ready to begin an entirely new set of registrations.

From the previous description it is apparent that the pressing of the grand total key 340 serves also to depress the summary total key 320, so that when either of these keys is depressed the idle pinions 325 (see Fig. 8) are thrown downward into mesh with the printer gears 140, and during such operation it is desirable to lock the amount keys from operation so as to prevent any movement of the registering segments 50 during this period. This result is effected by means of an arm 390 (see Fig. 8) which is fast to a rock shaft 391 and projects under the yoke frame 323 so that when said yoke frame is rocked downward by the depression either of the summary total key or the grand total key the rock shaft 391 will be rocked, and as shown in Fig. 2 said shaft 391 carries a series of rocking arms 392 formed with notches to engage pins 393 formed upon the registering segments 50 so that when the shaft 391 is rocked in this manner these arms 392 engage the pins 393 and lock the segments 50 in normal position.

The various amounts which are added upon the summary total counter may add up to figures which embody more digits than the ordinary capacity of the machine for a single registration by the keys; that is, there being five banks of amount keys the capacity of a single registration is limited to amounts embodying only these five banks of keys, but of course upon totalization, counter wheels of higher denomination are necessary as is usual in all machines of this class. In order to transfer to the printer wheels the amounts thus put up on these higher capacity wheels when the summary total counter is reset to zero, there are provided as shown in Fig. 9 two extra pairs of gears, the right hand one 400 of each of these pairs being the printer actuating gear and the left hand one 401 of each pair being the counter gear, there of course being no operating gear corresponding to the gear 52 in the other sets of gears of this nature since there are no operating segments coöperating with these gears of higher denomination. There are corresponding idle pinions 325 for these two pairs of gears 400 and 401 so that when the summary counter is reset to zero (or the grand total counter is reset to zero), the amounts previously registered upon the higher capacity counter wheels will be transferred to the printer wheels in the same manner as already described for the wheels of lower denomination, and that provides a printing capacity of seven digits, there being seven printing amount wheels 213 as shown in Fig. 12, whereas the greatest amount of a single registration is limited to five digits.

*Retaining pawls.*—For the purpose of retaining the counter gear wheels 141 (see Fig. 9) in proper position to be engaged by the idle pinions 142 (Fig. 8) and also to prevent retrograde movement of the same, retaining pawls 402 are provided which are mounted upon collars journaled upon the shaft 146, these pawls being held into engagement with their respective gear wheels by means of springs 403 (Fig. 8), the shape of the engaging noses of these pawls being such as to permit the wheels to turn in the proper direction but acting to permit retrograde movement and to aline their respective gear wheels.

The aforesaid high capacity counter gear wheels 401 are also alined and locked by means of pawls 404 (see also Figs. 8 and 9) which pawls are fast to the previously described arm 390 which is fast to the rock shaft 391 and also projects under the rocking yoke frame 323. Also attached to this arm 390 is a rearwardly extending arm 405 with which coöperates a cam 406 fast to the revolution shaft 38. From this is will be apparent that when the summary total key 320 is depressed for the purpose of striking a total the arm 390 is rocked downward as hitherto explained which also rocks downward the pawls 404 to withdraw the same from engagement from the higher capacity counter wheels 401 to permit the same to turn upon the resetting to zero of the summary total counter (or grand total counter), the pawls springing back to place as soon as the yoke frame 323 returns to normal upward position. The pawls 404 are also withdrawn from locking position upon the operation of the machine by the rotation of the shaft 38 and the camming downward of the arm 405 which occurs just before the operation of the transfer, to permit these higher capacity wheels to turn at such time.

The counter wheels for the grand total counter are provided with retaining pawls 407 (see Fig. 10) the rear ends of which are also shown in Fig. 8, these pawls being pressed into engagement with pinions formed on their respective counter wheels by means of springs 408. Attached by suitable collars to these pawls 407 are retaining arms 409 shown both in Figs. 8 and 10 which serve as a guide for the transfer pawls 185 and also prevent the lateral shifting of the counter wheels 156 upon their shaft during the shifting of said shaft upon the operation of resetting to zero.

*Zero printing.*—It is desirable to have means for printing the zeros on the higher denomination wheels only in case such zeros form a necessary part of the number to be printed, that is for any particular wheel, when the wheel of next higher order has been moved to print some number higher than zero, for in this manner superfluous figures are dispensed with. This means is shown in Figs. 17 and 17$^a$ and is applied to the printing wheels above the third order of denomination. These particular wheels are provided with a depressible zero pawl 410, this pawl being pivoted at 411 beneath the printing flange of the wheel and having at its printing end a zero type 412. There are of course upon each wheel two of these zero pawls for printing both from the top and bottom line of type as previously explained. A spring 413 normally depresses the pawl 410 and causes an ear 414 to rest in a curved notch 415 formed in a hub 416 of the wheel of next higher order which projects through from said higher order wheel in proximity with the zero pawl 410, as shown in the sectional view 17$^a$. When the higher denomination wheel is turned to print a number higher than zero its hub 416 is rotated from its normal position shown in Fig. 17 and forces the ear 414 out of the notch 415 and thus causes the zero pawl of its next lower denomination wheel to be forced outward into printing position so that an impression of this zero will be made when the printing is effected, provided of course this lower denomination wheel itself is not rotated, in which case the other numeral will be printed as ordinarily. The printing wheel 213 of highest denomination is shown at the left in Fig. 17$^a$ and of course its zero type is cut away since there is not any occasion for printing the zero from this higher wheel. When this highest wheel is moved to print any other digit however the wheel of next lower order has its zero pawls forced outward for printing in the manner just described, but if the wheels of still lower order are also to remain in normal zero position it is essential that these wheels also print zero, and for the purpose of forcing the zero pawls of these wheels into printing position, each pawl 410 has fast to its ear 414 a laterally projecting pin 417 which projects through a slot 418 formed in the side of its own wheel and normally rests under the zero pawl of the wheel of next lower order, so that when any zero pawl 410 is forced outward by this wheel of higher order in the manner just described, its pin 417 will act upon the zero pawl of next lower order to raise the same into printing position, and this process of course continues for each one of the line of lower denomination wheels having such zero pawls; there being in the present case three wheels of lowest denomination no such zero pawls, and three wheels of next higher order being provided with such zero pawls and the wheel of highest denomination having its zero type cut away as above explained. From this construction it results that the zeros connected with any amount are printed only when essential for the proper reading of the amount.

*Shifting printing carriage.*—The means for shifting the detail strip frame or carriage for printing the amount of the special transactions in a separate column will now be described. The general construction of the detail strip frame 281 and the parts mounted thereon has already been described with reference to Figs. 5 and 15. To the rear of the shaft 286 which as hitherto explained is rocked to carry the detail strip against the type, is the rotating and laterally shiftable shaft 43 which as previously explained is rotated at each operation of the machine by means of the gear wheel 42 (see Fig. 21). This shaft has formed upon its left hand end a disk 420 (see Figs. 5 and 15) which projects into a groove 421 formed in the collar 285 fast to the detail strip frame 281 and thus said frame 281 may rock independently of the disk 420 upon the operation of the printer, and the shaft 43 with the disk 420 may rotate independently of the frame 281, but when the shaft 43 is shifted laterally in the manner to be presently described, the disk 420 acts upon the collar 285 to slide the entire frame 281 laterally upon its shaft 286 so that the widened detail strip will now be shifted and the relatively stationary set of type wheels will of course print in a different column upon the detail strip, the amount of shifting of the frame 281 for this purpose being sufficient to suitably separate these two columns and of course the spline of the shaft 286 permits this lateral movement of the frame 281 and at the same time makes possible the rocking of the shaft for effecting the printing. This lateral shifting of the shaft 43 is effected by the operation of the machine upon the depression of any one of the three special transaction keys. As shown in Figs. 6 and 7 there is pivoted upon the rock shaft 49 an upwardly extending lever 423 to which is pivoted a horizontal link 424 which extends rearwardly to connect pivotally with a rocking frame 425 (see also Fig. 5) comprising a collar which is journaled upon the rock shaft 286, this frame carrying an upwardly extending arm 426 and a downwardly extending arm 427 which projects into proximity with the shaft 43 and carry pins 428 and 429 respectively, the pin 428 being arranged to engage a spiral groove 430 formed in a collar 431 fast to the shaft 43 and the pin 429 being arranged to engage a spiral groove 432 formed in a collar 433 also fast to the shaft 43. In the normal position of the machine the lower pin 429 stands opposite the space 434 between the two collars 431 and 433.

Referring again to Fig. 7 it will be seen that the lever 423 has formed on its forward side notches 435 which are arranged to be engaged by the pins 48 of the three transaction keys 32 so that upon the depression of any one of these keys the lever 423 will be forced rearward. Since the pins would strike at different distances from the fulcrum of the lever 423 the lever would tend to be moved different distances by the different keys, but this differential movement is compensated for by making the notches 435 so that the movement of the lever 423 by the three special keys is a uniform one, and since the pins 48 strike the lever 423 only near the extremity of movement of the keys the extent of movement of said lever is but small. Upon such movement the link 424 is forced rearward and thereby the frame 425 is rocked so as to carry the pin 428 into engagement with its spiral groove 430, also rocking the lower pin 429 out from two collars 431 and 433. Now upon the rotation of the shaft 43 upon the operation of the machine the spiral groove 430 acting upon the pin 428 causes the entire shaft 43 to be shifted laterally thereby shifting the detail strip frame 281 to effect the printing in a different column. To effect this shifting the rock frame 425 is held fixed in place by means of two collars 436 fast to the shaft 286 on either side of the frame 425. If upon the next operation of the machine a special key 32 is again depressed, no shifting effect is produced upon the shaft 423, for the extent of the previous shifting has been such as to carry the space between the two collars 431 and 433 opposite the upper pin 428 and hence the pin 428 when again carried downward simply enters this space between the collars and upon the rotation of the shaft 43 no shifting effect of the carriage is produced but the carriage is locked in position because of the engagement of the pin 428 in said space between the collars. If however upon the next operation of the machine no special key is depressed but an ordinary cash transaction is recorded, the lever 423 remains in normal position and therefore the lower pin 429 now rests in its spiral groove 432, the direction of which spiral is the reverse to that of the spiral 430, so that upon the revolution of the shaft 43 the spiral groove 432 acts upon the pin 429 to restore the shaft 43 and the detail strip printing frame 281 to normal position for the cash transactions, the shifting in each case preceding the printing movement. Thus it will be observed that the carriage is shifted only when it is necessary to change from one class of transactions to another and is not returned to any constant position at the end of each operation of the machine.

*Flash mechanism.*—Mechanism is provided whereby upon the operation of any one of the special transaction keys the flash for concealing the indicators will remain dropped so as to conceal the indicators. This mechanism is shown in Figs. 19 and 20. The flash arms 440 are pivoted at their middle points upon the shaft carrying the indicators 86, and between the arms are carried the shields 441 for concealing the indicators when the flash arm is dropped to horizontal position. Pivoted upon the previously described shaft 244 is a flash operating arm 442 which at its lower end is bent at right angles to form a horizontal extending arm 443 which runs parallel to the shifting shaft 43. Also pivoted upon the shaft 244 is a lever 444 having on its lower end an anti-friction roller 445 engaged by a cam 446 fast upon the upper revolution shaft 38. The upper end of the flash operating arm 442 is formed with a slot 447 engaging a pin 448 on one end of the said arms 440. Upon the operation of the machine the lever 444 is forced rearward by the cam 446 and by acting upon a pin 449 formed on the lower end of the arm 442 carries the upper end of the arm 442 forward and thereby drops the shields of the flash to conceal the indicators, and the spring 450 returns the flash to normal upper position to expose the indicators, and a spring 451 attached to the lever 444 returns said lever to normal position, retaining the same against its operating cam.

When the shaft 43 is shifted laterally by the operation of the machine when any one of the special transaction keys 32 is depressed as just explained above a collar 452 fast upon said shaft is brought into the path of the horizontally extending arm 443 so that after the lever has been operated to lower the flash to conceal the indicators, the collar 452 now comes in the path of the arm 443 and prevents the return of the same to normal forward position whereby the arm 442 is held in forward position causing the flash to conceal the indicators, and this condition obtains until the shaft 43 is returned to normal position upon the regular operation of the machine for a cash transaction in which case the flash is as ordinarily permitted to return to normal upward position to expose the indicators at the proper time.

While the form of mechanism here shown and described is admirably adapted to fulfil the objects primarily stated, it is to be understood that it is not desired to confine the invention to the one form of embodiment here disclosed, for it is susceptible of embodiment in various forms all coming within the scope of the claims which follow.

The invention having been described, what is claimed as new is as follows:

1. In a registering machine, the combination with a summary total counter, of a grand total counter; and printing devices including type carriers common to said two counters for printing the total from either one of the same as desired.

2. In a registering machine, the combination with a summary total counter, of a grand total counter; means for resetting each of said counters to zero independently of the other; and printing devices including type carriers common to said two counters for printing the total from either of the same as desired.

3. In a registering machine, the combination with a summary total counter, of a grand total counter; means for resetting each of said counters to zero independently of the other; printing devices common to said two counters for printing the total from either of the same as desired; and means controlling such printing of a total by the zero resetting movement of the counter.

4. In a registering machine, the combination with a summary total counter, of a grand total counter; printing devices common to said two counters for printing the total from either one of the same as desired; and means for preventing a printing of a total from the grand total counter until the total has been printed from the summary total counter.

5. In a registering machine, the combination with a summary total counter, of a grand total counter; means for resetting each of said counters to zero independently of the other; printing devices common to said two counters for printing the total from either of the same as desired; and means for preventing the resetting to zero of the grand total counter until the summary total counter has been reset to zero.

6. In a registering machine the combination with a summary counter, and a grand counter, each having a plurality of digit carriers, of means for connecting each grand digit carrier with the corresponding summary digit carrier to actuate the latter by the former.

7. In a registering machine, the combination with a summary total counter, of a grand total counter; a main operating mechanism; and means connected with said main operating mechanism for effecting an engagement between said summary total counter and said grand total counter at each operation of the machine whereby the latter counter will be operated by the former.

8. In a registering machine, the combination with a summary total counter, of a grand total counter; means for resetting each of said counters to zero independently of the other; printing devices common to said two counters for printing the total from either of the same as desired; and means for preventing the simultaneous resetting to zero of said counters.

9. In a registering machine, the combination with a summary total counter, of a grand total counter; means for resetting each of said counters to zero independently of the other; printing devices common to said two counters for printing the total from either of the same as desired; means controlling such printing of a total by the zero resetting movement of the counter; and means for preventing a printing of the total from the grand total counter until the total has been printed from the summary total counter.

10. In a registering machine, the combination with a summary total counter, of a grand total counter; means for resetting each of said counters to zero independently of the other; printing devices common to said two counters for printing the total from either of the same as desired; a lock for said zero resetting device for the grand total counter; and means for releasing said lock by the operation of the resetting to zero of the summary total counter.

11. In a registering machine, the combination with a summary total counter, of a grand total counter; means for resetting each of said counters to zero independently of the other; printing devices common to said two counters for printing the total from either of the same as desired; a lock for said zero resetting device for the grand total counter; means for releasing said lock by the operation of the resetting to zero of the summary total counter; a main operating mechanism; and means connected with said main operating mechanism for operating said lock again to lock said zero resetting means for the grand total counter after said lock has been released by said summary total counter zero resetting means.

12. In a registering machine, the combination with a summary total counter, of a grand total counter; printing devices for printing the total from either of said counters as desired; a manipulative device for preparing for the printing of a total from said summary total counter; and a second manipulative device for preparing for the printing of a total from said grand total counter.

13. In a registering machine, the combination with a summary total counter, of a grand total counter; printing devices for printing the total from either of said counters as desired; a manipulative device for preparing for the printing of a total from said summary total counter; a second manipulative device for preparing for the printing of a total from said grand total counter; and means connected with said second manipulative device for effecting an engagement between the grand total counter and the summary total counter when this second manipulative device is operated.

14. In a registering machine, the combination with a summary total counter, of a grand total counter; printing devices for printing a total from either one of said counters as desired; a manipulative device for establishing a connection between said summary total counter and said printing devices; means for resetting said summary total counter to zero whereby said printing devices will be correspondingly actuated upon such resetting to zero; a second manipulative device for establishing a connection between said grand total counter and said printing devices; and means for resetting said grand total counter to zero whereby said printing devices will be actuated correspondingly when such connection is established.

15. In a registering machine, the combination with a summary total counter, of a grand total counter; printing devices for printing a total from either one of said counters as desired; a manipulative device for establishing a connection between said summary total counter and said printing devices; means for resetting said summary total counter to zero whereby said printing devices will be correspondingly actuated upon such resetting to zero; a second manipulative device for establishing a connection between said grand total counter and said printing devices; means for resetting said grand total counter to zero whereby said printing devices will be actuated correspondingly when such connection is established; and means connected with said second manipulative device for effecting an engagement between said grand total counter and said summary total counter.

16. In a registering machine, the combination with amount determining means, and counter actuating means controlled thereby, of a counter; printing devices also controlled by said amount determining means; means for restoring said printing devices to normal position; a manipulative device for controlling the printing of a total from said counter; and means connected with said manipulative device for releasing said printing device restoring means.

17. In a registering machine, the combination with amount determining means, counter actuating means controlled thereby, a counter, and a main operating mechanism; of printing devices controlled by said amount determining means; a restoring means operated by said operating mechanism at the end of each operation of the machine to restore said printing devices to normal position; a manipulative device for controlling the printing of a total from said counter; and means connected with said manipulative device for releasing said restoring means.

18. In a registering machine, the combination with amount determining means, counter actuating means controlled thereby, and a counter, of printing devices also controlled by said amount determining means; a restoring means for restoring said printing devices to normal position; means for resetting said counter to zero; means for setting said printing devices to print the total from said counter when the latter is reset to zero; and means for releasing said restoring means when said counter is restored to zero.

19. In a registering machine, the combination with amount determining means, and an actuating device controlled thereby, of a counter operated by said actuating device; a type carrier also controlled by said actuating device; and common means for coupling and uncoupling said actuating device said counter and said type carrier whereby all three may move together when the coupling is established.

20. In a registering machine, the combination with amount determining means, and an actuating device controlled thereby, of a counter operated by said actuating device; a type carrier also controlled by said actuating device; a main operating mechanism; an idle pinion; and means connected with said operating mechanism for causing said idle pinion to effect an engagement between said actuating device said counter and said type carrier simultaneously.

21. In a registering machine, the combination with amount determining means, and an actuating device controlled thereby, of a counter operated by said actuating device; a type carrier also controlled by said actuating device; a main operating mechanism; an idle pinion; means connected with said operating mechanism for causing said idle pinion to effect an engagement between said actuating device said counter and said type carrier simultaneously; and a special device for shifting said idle pinion so that it will establish a connection only between said actuating device and said type carrier.

22. In a registering machine, the combination with amount determining means, and an actuating device controlled thereby, of a counter operated by said actuating device; a type carrier also controlled by said actuating device; a main operating mechanism; an idle pinion; means connected with said operating mechanism for causing said idle pinion to effect an engagement between said actuating device said counter and said type carrier simultaneously; a series of special transaction keys; and connections with said keys for shifting said idle pinion so that the same will effect an engagement only between said actuating device and said type carrier.

23. In a registering machine, the combination with a counter, and a main operating mechanism; of transfer elements for said counter including a tripping pin, a tripping pawl, and a transfer pawl; and means connected with said main operating mechanism for normally holding said transfer pawl out of coöperative relation with said tripping pawl.

24. In a registering machine, the combination with a counter, and a main operating mechanism; of transfer elements for said counter including a tripping pin, a tripping pawl, and a transfer pawl; means for resetting said counter to zero; means controlled by said operating mechanism for normally holding said transfer pawl out of contact with said tripping pawl; and means connected with said operating mechanism for bringing said transfer pawl into contact with said tripping pawl upon the initial operation of the operating mechanism.

25. In a cash register, the combination with accounting devices, means controlling the characteristics of transactions entered on the same and a main operating mechanism of a carriage slidable to cause the transaction to be entered in segregated groups, manipulative means for predetermining the position of said carriage and means connected with said operating mechanism to slide said carriage according to the position determined by said manipulative means.

26. In a cash register, the combination with printing devices, means for controlling the same, and a main operating mechanism, of a carriage for carrying paper for securing the printing in different groups; manipulative means for predetermining the position of said carriage; and means connected with said operating mechanism for moving said carriage to cause the printing to take place in the group determined by the manipulative means.

27. In a cash register, the combination with printing devices, means for controlling the same, and a main operating mechanism, of a movable carriage for carrying paper for securing the printing in different groups; manipulative means for predetermining the position of said carriage; and shifting means connected with said operating mechanism for moving said carriage to different positions according to the adjustment of said manipulative means, said shifting means permitting the continued retention of said carriage in the same position when there is no change in the adjustment of the manipulative means upon a succeeding operation of the machine.

28. In a cash register, the combination with printing devices, means for controlling the same, and a main operating mechanism, of a carriage for carrying paper for securing the printing in different groups; shifting means connected with said main operating mechanism for moving said carriage; manipulative means which when operated causes the operating mechanism to shift said carriage out of its normal position whereby to print in a different group; and means for automatically restoring said carriage to normal position upon a succeeding operation of the machine when the manipulative means has not been operated.

29. In a cash register, the combination with printing devices, means for controlling the same, and a main operating mechanism, of a carriage for carrying paper for printing; shifting means connected with said operating mechanism for moving said carriage to cause the printing to be made in different columns; a special key and connections coöperating with said shifting means to cause the carriage to be moved out of normal position to print in a different column, said carriage shifting means permitting the continued retention of the carriage in displaced position so long as the special key is again operated upon a succeeding operation of the machine; and means for automatically shifting said carriage back to normal position when the special key is not operated upon a succeeding operation of the machine.

30. In a cash register, the combination with printing devices, means for controlling the same, and a main operating mechanism, of a carriage for carrying paper for securing the printing in different groups; a carriage shifting device connected with said main operating mechanism and comprising a revoluble member having a spirally formed actuating portion; and manipulative means and connections coöperating with said spirally formed portion to effect the shifting of said carriage upon the operation of said operating mechanism.

31. In a cash register, the combination with printing devices, indicating devices, means for controlling said printing and indicating devices, a flash for concealing the indicators, and a main operating mechanism; of a carriage for carrying paper for securing the printing in different groups; means for shifting said carriage; and means connected with said shifting carriage for controlling the position of said flash.

32. In a cash register, the combination with printing devices, indicating devices, means for controlling said printing and indicating devices, a flash for concealing the indicators, and a main operating mechanism; of a carriage for carrying paper for securing the printing in different groups; means for shifting said carriage; and means for causing said flash to remain in concealing position when said carriage is shifted to a certain position.

33. In a cash register, the combination with printing devices, indicating devices, means for controlling said printing and indicating devices, a flash for concealing the indicators, and a main operating mechanism; of a carriage for carrying paper for securing the printing in different groups; means for shifting said carriage; manipulative means and connections for causing the operating mechanism to shift said carriage; means connected with said operating mechanism for operating said flash to conceal the indicators; and means connected with said carriage for causing the flash to be retained in concealing position when the carriage occupies a certain one of its positions.

34. In a cash register, the combination with indicating devices, and means for positioning the same, a flash for concealing said indicators, a main operating mechanism for moving said flash in one direction, and yielding devices for moving said flash in the opposite direction of a manipulative device, and means operated by said manipulative device for preventing the operation of said yielding device and thereby retaining said flash in its position as adjusted by the main operating mechanism.

35. In a recording machine, the combination with a series of type carriers, one of said carriers having a zero type normally positioned below the printing level of the remaining type of said carrier; and means operated by a type carrier of higher order for moving said zero type to printing level to permit the printing of a zero in conjunction with the printing from the carrier of higher order.

36. In a recording machine, the combination with a series of type carriers each of the same having zero type mounted thereon but normally positioned below the printing level of the other type on said carriers; means operated by a carrier of higher order for moving the zero type of the carrier of next lower order to printing level; and means connected with the said zero type for moving to printing level all of the zero types of the carriers of still lower order.

37. In a recording machine, the combination with a series of type wheels, of a zero type pivoted upon one of said wheels and normally spring-pressed to retain the zero type below the printing level of the other type on said wheel; and an operating extension operated from the type wheel of next higher order and coöperating with said zero type to permit the same to remain below the printing level when the wheel of higher order stands at zero position but to force said zero type to printing level when the wheel of higher order is moved out of its zero position.

38. In a registering machine the combination with a plurality of counters, of printing members, and means for controlling said members to print totals by an actuation of any desired counter.

39. In a registering machine the combination with a plurality of counters, of printing members common to all said counters, and means for connecting any desired counter to actuate said printing members.

40. In a registering machine, the combination with summary and grand counters, each having a plurality of digit carriers, of type segments, and means for setting up on each segment the amount represented by the corresponding digit carriers of either counter as desired by an actuation of the selected counter.

41. In a registering machine, the combination with summary and grand counters, of total printing mechanism common to said counters, hand operated means for resetting each counter to zero, and connections for thereby setting the printing mechanism to print the total of the counter which is reset.

42. In a registering machine, the combination with summary and grand total counters, each comprising digit carriers, of type segments equal in number to the carriers of either counter, means for connecting the carriers of either counter to said segments and means for resetting the connected counter and thereby setting the segments to print the total of the reset counter.

43. In a registering machine, the combination with a plurality of counters, of separate means for resetting them to normal position, and means preventing resetting of more than one counter at the same time.

44. In a registering machine, the combination with a plurality of counters, of separate means for resetting each counter to zero, and means for locking one resetting means while another is being operated.

45. In a recording machine, the combination with a type carrier, of a carriage with paper for taking impressions from said type carrier, an operating mechanism for said type carrier, means actuated by said operating mechanism for laterally shifting said carriage, and means also actuated by said operating mechanism for reversely shifting said carriage on a succeeding operation of said mechanism.

46. In a recording machine, the combination with an operating mechanism, and printing mechanism adjusted thereby, of a paper carriage, connections between said operating mechanism and carriage for positively shifting said carriage laterally, and means for reversing said connections to cause a return shift of said carriage.

47. In a cash register, the combination with means for retaining in the register an entry of transactions, concealing means for same, means for determining the characteristics of transactions entered in the register, of a main operating mechanism for adjusting said concealing means in one direction, a spring for returning said concealing means, and manipulative devices for preventing said spring from performing its function.

48. In a cash register, the combination with a registering and printing mechanism and devices for determining the extent of their movement, of a shaft and a series of pinions thereon for connecting said determining devices to said registering mechanism, and means for shifting said pinions laterally on their shaft to prevent operation of said registering mechanism.

49. In a cash register, the combination with a first registering device, and means for operating same, of a second registering device operated by said first registering device.

50. In a registering machine, the combination with a summary total counter, of a grand total counter and a means operable at each operation of the machine for effecting an engagement between said summary total counter and said grand total counter whereby the latter will be actuated by the former.

51. In a registering machine, the combination with an actuating device, of a summary total counter driven thereby, a grand total counter, and provisions for causing said grand total counter to engage said summary total counter and be operated thereby.

52. In a registering machine, the combination with an actuating device, of a summary total counter driven thereby, a grand total counter, provisions for causing said grand total counter to engage said summary total counter and be operated thereby, printing devices common to both said counters, and means for adjusting said printing devices to print the total from either of said counters.

53. In a machine of the character described, the combination of a set of actuators and two sets of accumulator wheels, motion being transmitted between the actuators and the wheels of one set through the medium of the wheels of the other set in either direction.

54. In a machine of the character described, the combination of a set of actuators and two sets of accumulator wheels geared together, motion being transmitted between the actuators and the wheels of one set through the medium of the wheels of the other set in either direction.

55. In a machine of the character described, the combination of a set of actuators, two sets of accumulator wheels, motion being transmitted between the actuators and the wheels of one set through the medium of the wheels of the other set in either direction, means common to the two sets of wheels for imparting transfer or carrying movements thereto, and separate sets of transfer tripping devices, one set for each set of wheels.

56. In a recording machine arranged to print items either with or without accumulation, and to print totals, means for automatically and as an incident to the printing without accumulation, printing a suitable character to indicate that a particular item was printed without accumulation and for also automatically printing another suitable character to distinguish a total from the individual items; substantially as described.

57. In a recording machine arranged to print items either with or without accumulation and to print totals, special printing mechanism adapted to automatically and as an incident to the printing without accumulation, print a suitable character to indicate when the machine is in a condition of non-accumulation and another suitable character to indicate when the machine is "clear" or when a total is taken; substantially as described.

58. In a machine of the character described, the combination with accumulating and printing mechanism; of means for eliminating accumulation, and a lock for preventing operation of such means during operation of the accumulating mechanism.

59. In a machine of the character described, the combination with accumulating and printing mechanism; of means for eliminating accumulation, and a lock for preventing operation of such means during operation of the accumulating mechanism, with provisions for holding said means set during operation of the printing mechanism unaccompanied by operation of the accumulating mechanism.

60. In a machine of the character described, the combination of accumulating and printing mechanisms and actuating means therefor; of a depressible key for disabling the accumulating mechanism, and a lock for preventing depression of such key during operation of the accumulating mechanism by the actuating means.

61. In a machine of the character described, the combination of accumulating and printing mechanisms and actuating means therefor; of a depressible key for disabling the accumulating mechanism, and a lock for preventing depression of such key during operation of the accumulating mechanism by the actuating means with provisions for holding said key depressed during an operation of the printing mechanism unaccompanied by an operation of the accumulating mechanism.

62. In a machine of the character described, the combination of accumulating and printing mechanisms and actuating means therefor; of a depressible key for disabling the accumulating mechanism, a latch for holding said key depressed, and a lock for preventing depression of such key during operation of the accumulating mechanism by the actuating means.

63. In a machine of the character described, the combination of accumulating and printing mechanisms and actuating means therefor; of a depressible key for disabling the accumulating mechanism, a latch for holding said key depressed, and a lock for preventing depression of such key during operation of the accumulating mechanism by the actuating means, with provisions for holding said key depressed during an operation of the printing mechanism.

64. In a machine of the character described, the combination with accumulating and printing mechanisms and actuating means therefor; of a depressible key for disabling the accumulating mechanism, and a reciprocating lock-plate adapted to engage said key when depressed and prevent it from rising during an operation of the printing mechanism by the actuating means unaccompanied by an operation of the accumulating mechanism.

65. In a machine of the character described, the combination with accumulating and printing mechanisms and actuating means therefor; of a depressible key for disabling the accumulating mechanism, and a reciprocating lock-plate adapted to engage said key to prevent its depression during operation of the accumulating mechanism by the actuating means.

66. In a machine of the character described, the combination with accumulating and printing mechanisms and actuating means therefor; of a depressible key for disabling the accumulating mechanism, and a reciprocating lock-plate adapted to engage said key when depressed and prevent it from rising during and operation of the printing mechanism by the actuating means unaccompanied by an operation of the accumulating mechanism, said lock-plate adapted to engage the key to prevent its depression during operation of the accumulating mechanism.

In testimony whereof I affix my signature in the presence of two witnesses.

THOMAS CARROLL.

Witnesses:
  WM. O. HENDERSON,
  JOHN J. UNGVÁRY.